United States Patent [19]

Stojkov et al.

[11] Patent Number: 5,178,566

[45] Date of Patent: Jan. 12, 1993

[54] MARINE DRIVE SYSTEM WITH BELT DRIVE

[75] Inventors: Mark Stojkov, Parma; John T. Venaleck, Madison, both of Ohio; Carl W. Rose, Jr.; Charles R. Anspach, both of Cape Coral, Fla.; Park French, Aurora, Ohio; James A. Bacnik, Mentor, Ohio; John E. Hartman, Painesville, Ohio

[73] Assignee: Ohio Associated Enterprises, Inc., Painesville, Ohio

[21] Appl. No.: 537,060

[22] Filed: Jun. 12, 1990

[51] Int. Cl.⁵ ............................. B63H 25/42
[52] U.S. Cl. ......................... 440/75; 474/140
[58] Field of Search ............ 440/21, 26, 29, 30, 440/49, 75, 76, 111, 112, 900; 474/101, 111, 133, 135, 140

[56] References Cited

U.S. PATENT DOCUMENTS

| 743,700 | 11/1903 | Dupuis | 440/75 |
|---|---|---|---|
| 2,345,689 | 4/1944 | Snadecki | 440/75 |
| 3,088,430 | 5/1963 | Champney | 440/75 |
| 3,153,397 | 10/1964 | Mattson | 440/76 |
| 3,185,122 | 5/1965 | Pleuger | 440/75 |
| 3,207,119 | 9/1965 | Holder | 440/75 |
| 3,403,655 | 10/1968 | Warburton | 440/75 |
| 3,707,939 | 1/1973 | Berg | 440/75 |
| 3,951,096 | 4/1976 | Dunlap | 440/57 |
| 4,337,055 | 6/1982 | Mackay | 474/140 |
| 4,466,802 | 8/1984 | Ojima | 474/140 |
| 4,721,485 | 1/1988 | Suzuki | 440/76 |
| 4,869,692 | 9/1989 | Newman | 440/75 |
| 4,869,708 | 9/1989 | Hoffmann | 474/140 |
| 4,887,983 | 12/1989 | Bankstahl et al. | 440/57 |
| 5,069,643 | 12/1991 | Westberg | 440/900 |

*Primary Examiner*—Joseph F. Peters, Jr.
*Assistant Examiner*—Clifford T. Bartz
*Attorney, Agent, or Firm*—Watts Hoffmann Fisher & Heinke

[57] ABSTRACT

An outdrive system for watercraft includes use of plastic or other relatively flexible material, e.g., compared to metal, especially as a housing material, and techniques which enable and/or at least facilitate use of such housing material. One of those techniques employs a flexible member, such as a belt, to couple power between the input and output of an outdrive and another employs a cooling system to remove heat. The invention also relates to use in a vehicle drive, especially for watercraft, of housing materials that are not subject to corrosion, galvanic action and the like.

30 Claims, 15 Drawing Sheets

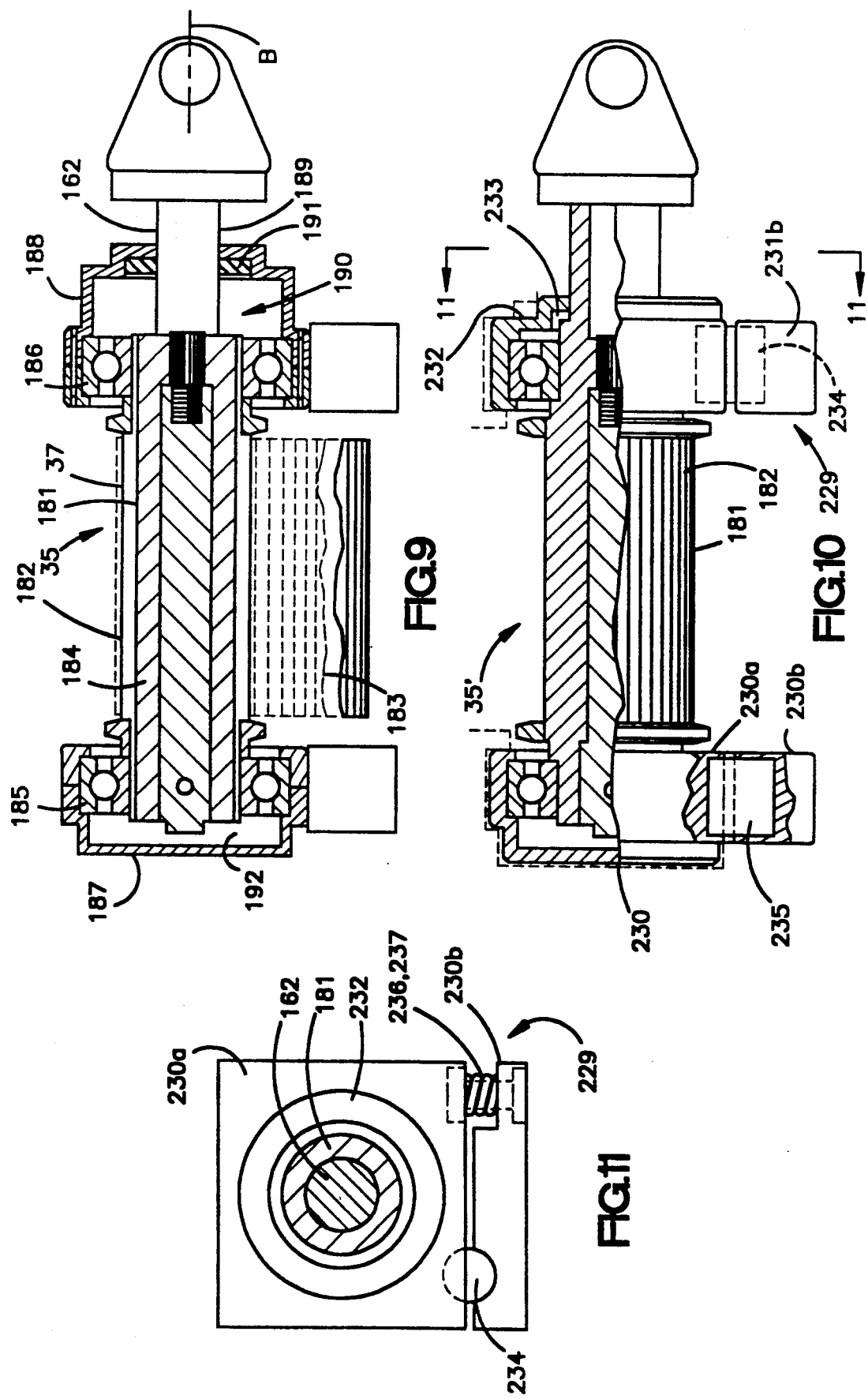

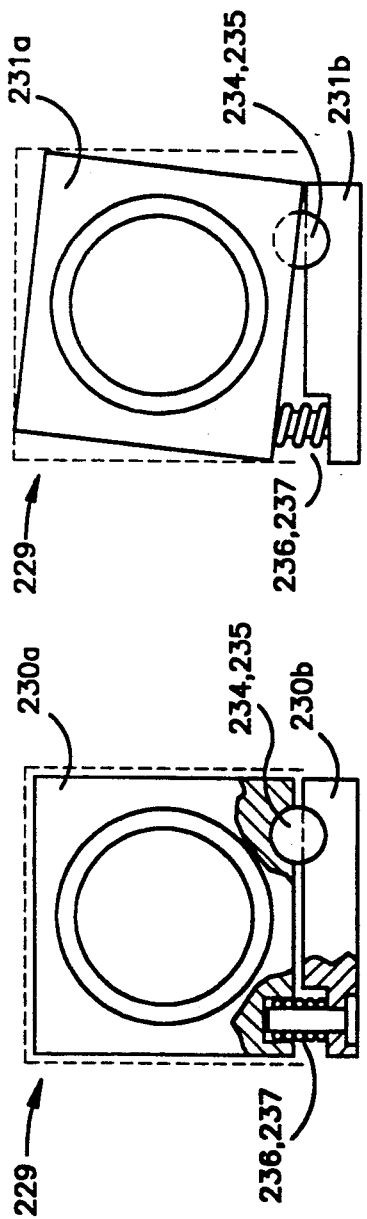
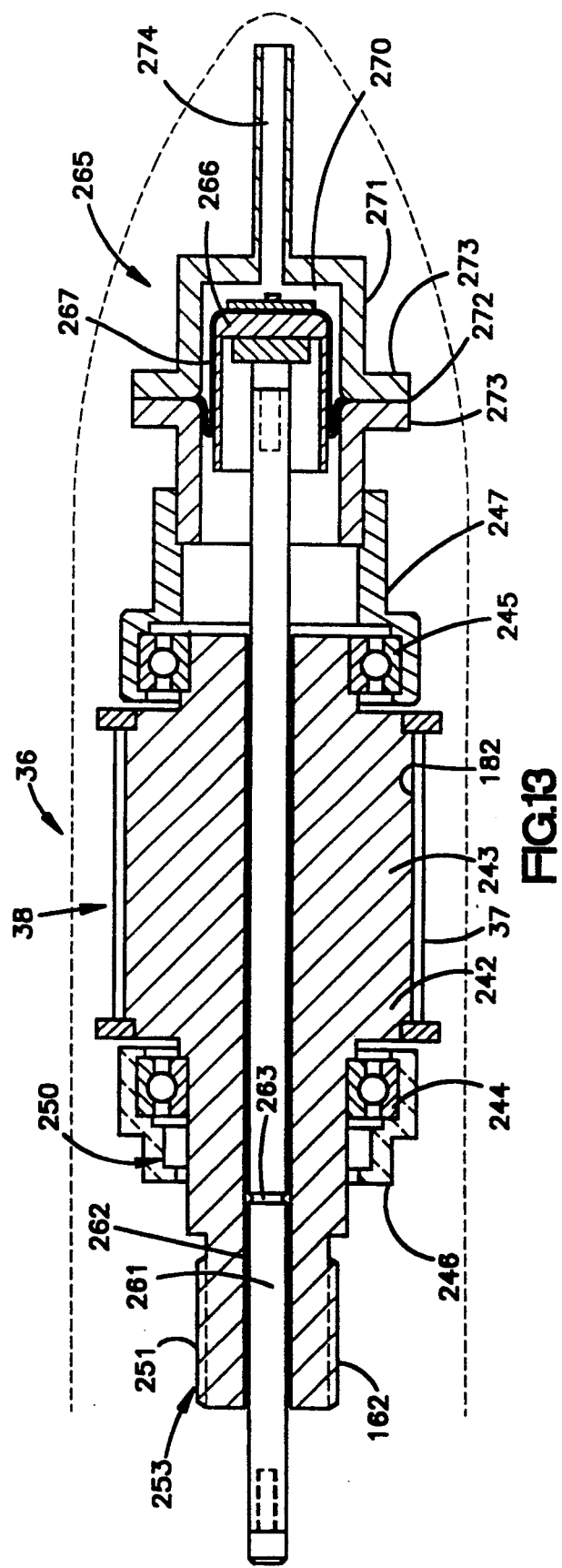

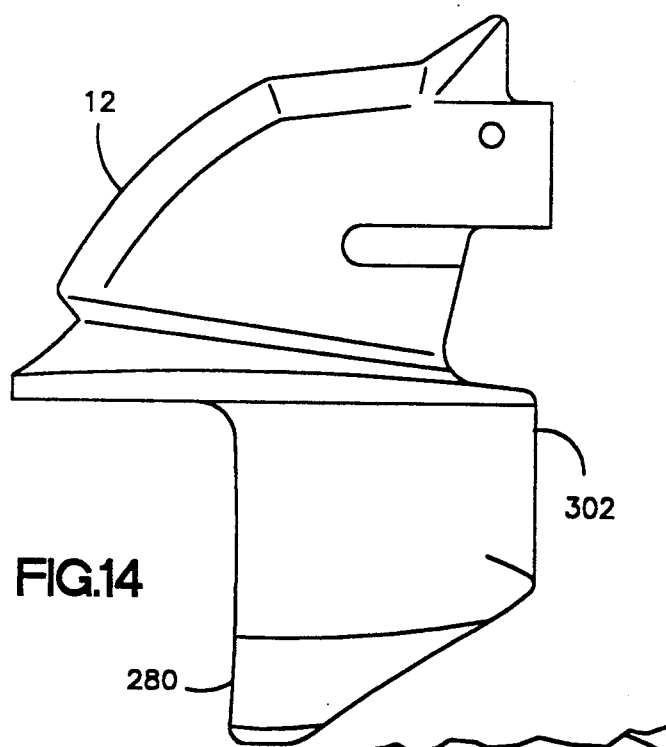
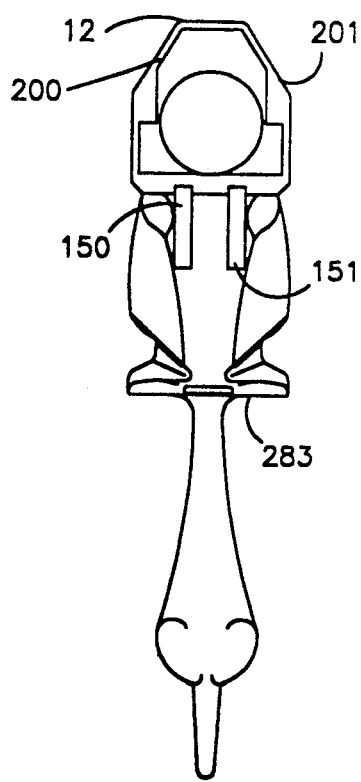
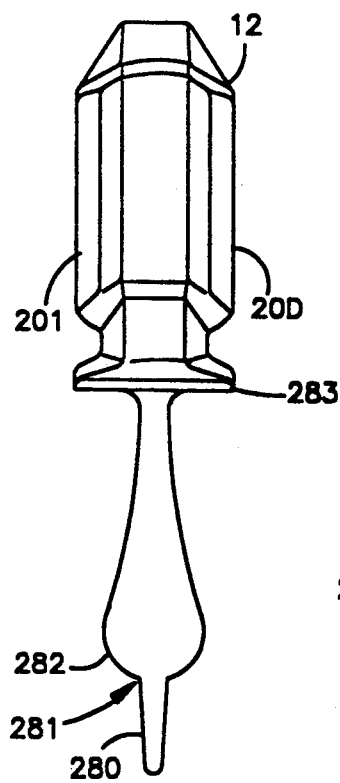
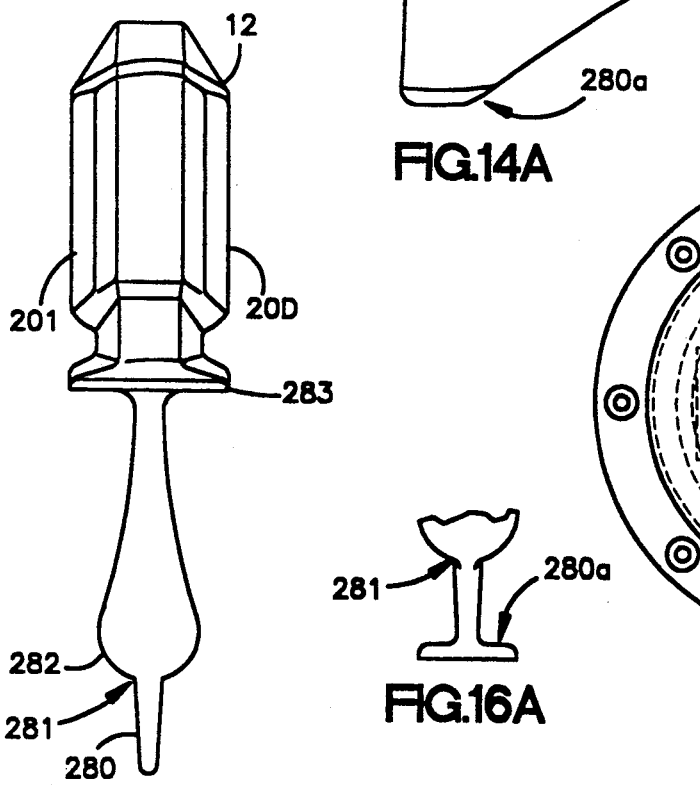
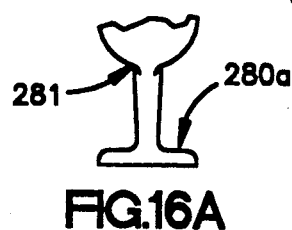
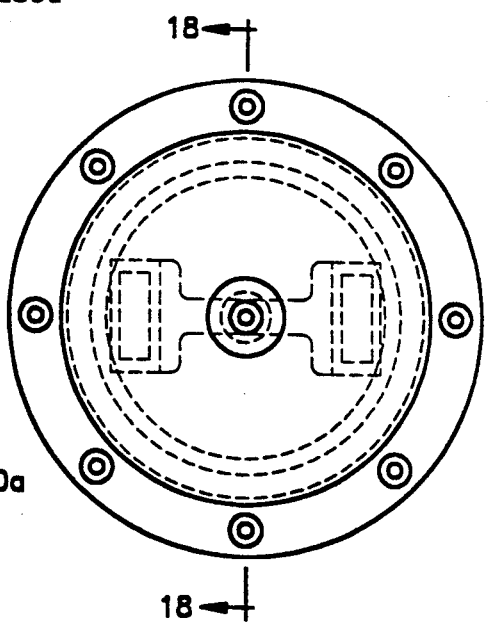

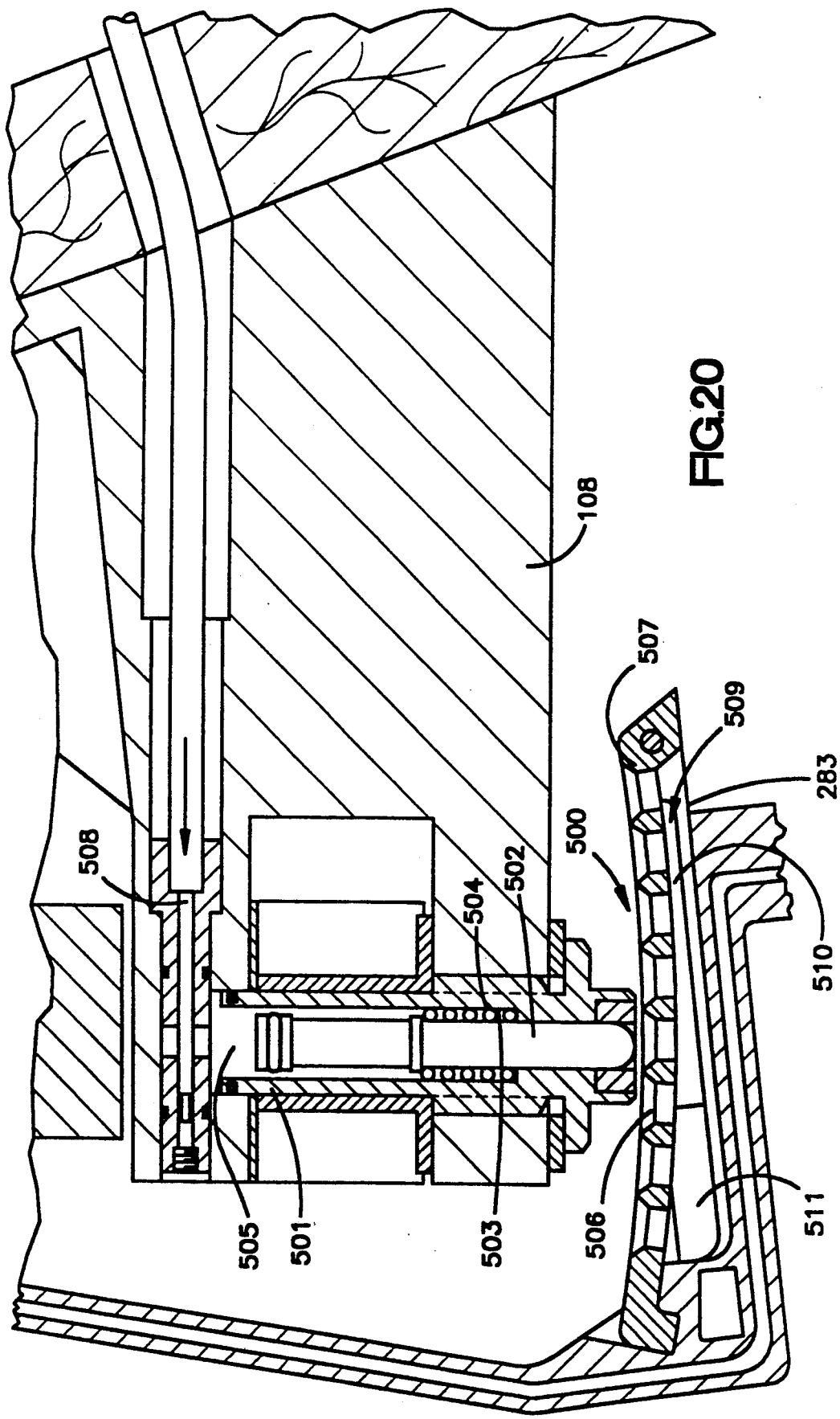

MARINE DRIVE SYSTEM WITH BELT DRIVE

TECHNICAL FIELD

The present invention relates generally to drive systems for vehicles, especially watercraft. More particularly, the invention relates to outdrives for boats.

In a preferred exemplary embodiment of the invention, features include, among others, use of plastic or other relatively flexible material, e.g., compared to metal, especially as a housing material, and techniques which enable and/or at least facilitate use of such housing material. One of those techniques employs a flexible member, such as a belt, to couple power between the input and output of an outdrive and another employs a cooling system to remove heat. The invention also relates to use in a vehicle drive, especially for watercraft, of housing materials that are not subject to corrosion, galvanic action and the like.

BACKGROUND

In an exemplary drive system for a vehicle, there usually is a power supply, an output mechanism, a power coupling system, and a housing and/or structural apparatus. The power supply typically is an engine or a motor, although other means also may be employed. The output mechanism converts power received from the power supply to motive force for the purpose of moving and directing the vehicle. In a boat, the output mechanism typically is a propeller. The power coupling mechanism couples, transmits or transfers power from the power supply to the output mechanism. Often the power coupling system includes one or more of a drive shaft, an output shaft, other coupling gears and shafts, a clutch, a transmission, etc. The housing and/or structural support apparatus typically holds one or more of the other components of the drive system in relation to each other in order to accomplish the appropriate interaction to effect the desired driving function. Additionally, the housing and/or structural support mechanism may provide, to the extent needed and/or desired, appropriate enclosure functions.

The present invention preferably relates to drive systems for boats. As it is used herein, the term "boat" is intended to mean virtually any type of watercraft, vehicle, apparatus, device, etc., that is intended to be operated on, in and/or under water. The features of the present invention are particularly useful with surface craft, i.e., boats that float and/or are operated at the water surface, and especially drive systems therefor that are rated at from about 100 horsepower up to about beyond 1000 horsepower. However, it will be appreciated that features of the invention may be used with other boat drive systems and at other power levels, e.g., those that are rated at less than 100 horsepower or more than several hundred horsepower, or even more than 1,000 horsepower, depending on the sizes of the several components of the outdrive.

Moreover, although the features of the present invention are particularly useful in and relate to boat drive systems, it will be appreciated, and it is intended, that features of the invention may be used in drive systems for vehicles other than boats and/or in other applications, too. For compactness, though, the following description is directed to application of the features of the invention in drive systems for boats; application of features of the invention in other drive systems will be evident to those having ordinary skill in the art in view of the disclosure hereof.

Conventional boat drive systems often are categorized by labels inboard, outboard, and inboard/outboard. In an exemplary inboard drive system the power supply, which will be referred to hereinafter for convenience as an engine although it may be a motor or some other source of power, and the majority of the power coupling system are located within the boat, which provides at least some housing and structural support functions. The propeller and at least part of the propeller shaft, of course, are located outside the boat in the water, as also is the case for outboard and inboard/outboard drive systems. One example of an inboard drive system is an in line system in which the engine, clutch, transmission and propeller shaft generally are in line facing from the front to the back of the boat, the propeller being at or near the back. Another example of an inboard drive system is referred to as a V-drive, as is known. In an outboard drive system typically the engine and the power coupling system are located outside or mostly outside the boat. Furthermore, in an inboard/outboard drive system an exemplary configuration employs an engine located in the boat and a power coupling system that has a substantial portion located outside the boat. The foregoing is exemplary; it will be appreciated that various hybrid combinations of the foregoing categories of boat drive systems, as well as other types of boat drive systems also exist and/or may exist in the future.

The present invention includes features that may be useful in the various categories or types of boat drive systems mentioned above and in others that may not be specifically identified. However, according to the preferred embodiment and best mode, as is described in greater detail below, the present invention has particular utility when employed in and/or with the outdrive portion of the power coupling system of an inboard/outboard boat drive system and of outboard boat drive systems. Features of the invention also are especially useful in V-drive systems.

The term outdrive typically means that portion of a vehicle drive system, usually excluding the engine, which is located outside the hull of a boat. The outdrive usually is part of or is the entire power coupling system of a boat drive system and also may include the output mechanism, typically the propeller. As they are used herein, the terms outdrive and power coupling system may be used synonymously, and such terms also may be used to designate non-overlapping parts or functions, i.e., not synonymously; the context will make the usage clear. For example, the engine drive shaft itself may be considered part of the power coupling mechanism, as is the universal joint, but only the latter usually would be considered part of the outdrive.

In a conventional outdrive type of power coupling system, power is coupled between the engine and the output mechanism, which for convenience is referred to hereinafter as the propeller. Typically during use the engine drive shaft or at least the power input shaft for the outdrive and the propeller shaft are oriented in generally parallel horizontal directions and are vertically spaced apart. The conventional outdrive includes a rigid coupling shaft and associated gears to couple the rotary output from the drive shaft to the propeller shaft. Accurate positioning of the various parts of such a conventional outdrive is necessary in order to assure proper alignment and meshing of respective gears and shafts, as is well known. Relatively rigid metal castings typically are used as housings for such outdrives to provide the necessary stiffness to obtain the necessary accurate positioning functions mentioned.

The gears, coupling shaft, and metal castings employed as housings and/or other parts for such conventional outdrives are relatively expensive to manufacture and are relatively heavy. A disadvantage due to the weight of such conventional outdrives is the difficulty in disassembling the outdrive for servicing. Frequently at least two people are needed to handle such a heavy apparatus. It would be desirable to reduce the weight of and the expense of manufacturing an outdrive. Moreover, by reducing the weight of the outdrive, the overall weight of the boat is reduced; and by maintaining the same horsepower capability for the outdrive, performance of the boat, e.g., the speed, can be improved. Other features of the invention, which will be described below also can be employed to reduce the weight of the boat and, thus, improve performance.

The gears and coupling shafts of such conventional outdrives are usually located in an oil filled chamber. The oil provides usual lubricating function. Heat developed by the rotating gears and shafts heats the oil, which is cooled by thermal conduction through the metal housing of the outdrive to the water in which the outdrive, indeed the boat, are immersed.

Due to the prior designs of outdrives and the mounting mechanisms for mounting the outdrive to a boat, and at least in part due to the relatively heavy weight of such prior outdrives, it was a difficult and time consuming task to remove the outdrive from the boat. Usually part of the disassembly and removal process required work to be performed from inside the boat to remove the tiller arm and gimbal ring, and in some circumstances the engine itself first had to be loosened or even removed to allow access to the mounting mechanism therefor. The gimbal ring mounting structure often used in conventional outdrives provides or permits for movement of at least part of the outdrive, about two axes, typically referred to as rudder and trim axes. The difficulty of removing a conventional outdrive is a disadvantage of such prior devices.

One example of an outdrive which uses a flexible power coupling member in the form of a belt is disclosed in Dunlap U.S. Pat. No. 3,951,096. Such outdrive has a metal housing with two separate hollow down legs to enclose the two respective legs of the belt. Such hollow down legs extend between the upper housing portion where a drive sprocket is located and the lower housing portion (sometimes referred to as the torpedo) where a driven sprocket is located. The driven sprocket is coupled to the propeller. The present invention includes a number of improvements that may be employed with such a belt driven outside.

Outdrives have included kickup features so that the outdrive kicks up or tilts out of the way when it strikes an object, such as a log, rock, lake bottom, etc. to avoid damage to the outdrive and/or other parts of the drive system or boat. Usually hydraulic cylinders having high pressure hydraulic fluid therein hold the outdrive, especially the propeller, at a particular trim angle to obtain a particular thrust angle for desired boat operation. If the outdrive strikes an object, hydraulic fluid in such cylinders is forced through small orifices to allow the outdrive to kickup out of the way of such object. The speed with which the fluid flows is a function of orifice size and fluid pressure, which in turn is a function of the force applied to the outdrive by the object struck.

SUMMARY

Briefly, according to the present invention, a power coupling apparatus, such as an outdrive or the like, employs a housing structure that is generally less rigid than a conventional metal casting (although, if desired, in principle it could be made equally rigid), such housing being formed, for example, of plastic or plastic-like material, together with a number of features which cooperate to enable and/or to facilitate the use of such housing material in an outdrive. The housing structure and the various features according to the present invention are described in detail below and are particularly pointed out and distinctly claimed independently and in combination in various ones of the claims.

Another aspect of the invention is to employ techniques that enable use of plastic, polymer, resin or other materials that have similar properties as the material from which the housing and possibly other parts, too, of an outdrive may be made.

According to one feature of the present invention, the housing, or at least a substantial portion of the housing, for an outdrive is a relatively lightweight material, such as a plastic material or plastic-like material. Compared to metal housings for outdrives, a number of advantages inure to the use of plastic material, including, for example, lightness of weight, convenience and low cost of manufacturing using molding techniques, insensitivity to problems due to corrosion, galvanic action, receptivity of paint (such as anti-fouling paint without associated galvanic corrosion problems, bottom paint, etc.), as well as others.

However, compared to metal material, plastic material usually is more flexible and more susceptible to creep. Metal is stiffer and less susceptible to creep. Also, plastic material usually is less thermally conductive than metal, which therefore makes it unlikely that adequate heat removal by conduction through the outdrive housing into the water would be possible. Such flexibility may result in lack of adequate stability and/or accurate maintaining of relative placement and/or location of conventional outdrive parts, such as the gears, shafts, and/or other parts that effect coupling of power in a conventional outdrive.

According to a feature of the invention, a flexible power coupling is used to couple power in the outdrive to obtain an effective transfer of power, for example, between the drive shaft and the propeller shaft.

The use of such a flexible coupling allows the use of plastic for an outdrive housing, even though such plastic is susceptible to creep and is less stiff or rigid than metal. Such use of plastic desirably provides the benefits of reduced cost, lighter weight, corrosion resistance, etc., as are described in greater detail herein and will be evident from the description hereof. Such flexible power coupling may be a belt, a chain, or an equivalent flexible member, which is not so sensitive to precision alignment required for conventional power coupling apparatus that employ gears and shafts. The flexible member will be referred to below as a belt for convenience. However, it will be appreciated that other flexible members, such as chains or equivalent devices, may be used in place of the belt according to the principles of the invention.

Another aspect is to back bend an endless loop flexible drive member during use, especially by using generally non-moving surfaces. Another aspect is to remove heat from a drive system using such a flexible drive member.

Another feature of the invention includes a technique for streamlining or reducing the profile of an outdrive that uses such a flexible coupling. Therefore, the outdrive will have an external appearance that is generally aesthetically pleasing in that it will be the same or similar to that of a conventional cast aluminum outdrive, for example. Also, the reduced profile improves the hydrodynamic characteristics, especially by reducing drag, compared to a large profile single leg housing that would be needed to contain the two belt legs, for example.

Accordingly, a technique is employed to bend or to urge the belt legs back toward each other in at least part of the down leg of the outdrive housing, i.e., that zone between the upper housing portion and the lower housing portion (torpedo). To effect such back bending skid plates (also referred to herein as back benders) are provided in the housing, and the belt slides across the skid plates which urge the belt legs toward each other. A lubricant, such as an oil material, may be used to reduce friction at the sliding interface between the skid plates and the belt. Such back bending reduces the space required for the belt between the upper and lower housing portions and, thus, reduces the cross-sectional size dimensions or profile of the outdrive presented transverse to the travel direction through the water. Drag tends to be minimized while efficiency tends to be maximized.

To remove heat from the outdrive is another feature of the invention, particularly since the preferred housing material usually would be less thermally conductive than prior metal housings. To remove heat, water from outside the outdrive is directed into heat exchange relationship with one side or surface of the mentioned skid plates outside of the belt chamber which is in the housing and contains the belt. The skid plates preferably are relatively thermally conductive, e.g., as a metal, especially aluminum. Heat generated at the skid plates and/or elsewhere in the outdrive is transferred to the skid plates, e.g., by the above-mentioned oil in the belt chamber, and that heat is conducted through the skid plates to the water at the other surface thereof. If desired, the water then may be directed to the engine for conventional engine cooling purposes.

Still other features relate to use of plastic materials and molding techniques for other parts of an outdrive.

It also will be appreciated that a preferred embodiment of the invention is described in detail below. However, the scope of the invention is intended to be limited only by the scope of the claims and the equivalents thereof.

As it is used herein the term "plastic" means the conventional definitions of plastic, such as polymer material, synthetic material and so forth. Plastic includes both thermoset type plastic and thermoplastic. Plastic includes a material that preferably can be molded or laid up. It includes a material that will not encounter the types of corrosion and similar problems that may occur to a metal material. Usually a plastic material will be less stiff or rigid than metal, i.e., plastic typically is more flexible than metal. Plastic also usually has a greater tendency to creep than does a metal. Further, plastic often does not have as efficient a thermal conduction capability as does metal.

Various examples of plastic material may be used in accordance with the present invention.

One aspect of the invention relates to an outdrive for a boat including a power input shaft, a power output shaft, a flexible mechanism for coupling power between the shafts, and a single chamber housing the flexible mechanism during travel between the shafts.

Another aspect of the invention relates to a drive system including a power input shaft, a power output shaft, an endless loop flexible mechanism for coupling power between the shafts, the flexible mechanism having plural legs extending between the shafts, and a bending device for bending the endless loop flexible mechanism so that at least one of the legs is bent toward the other.

Another aspect relates to a plastic drive for boats including a plastic housing, a power input shaft, a power output shaft and a flexible mechanism in the plastic housing for transferring power between the shafts.

Another aspect relates to the use of plastic for the housing of a power coupling system for boats or other vehicles.

Another aspect relates to a technique for removing heat from an outdrive or the like which has a relatively non-thermally conductive housing.

The outdrive of the invention also includes a trim feature and a kickup feature.

Another aspect relates to a lock mechanism to prevent undesired tilting of an outdrive during reverse driving.

Another aspect relates to a system for pretensioning a flexible drive member, such as a belt, chain or the like, including a support for supporting the flexible drive member for movement in the fashion of an endless loop, a housing for containing at least a portion of the support and the flexible drive member, and a mechanism for applying pressure to the support mechanism in a direction to increase tension on the flexible drive member.

Another aspect relates to a system for pretensioning a flexible drive member, such as a belt, chain or the like, including a support for supporting the flexible drive member for movement in the fashion of an endless loop when driven by a power supply, for example, and a mechanism for changing tension on the flexible drive member as a function of the received power or the torque applied thereto.

Another aspect relates to a mechanism for applying tension to a flexible member, such as a belt, chain or the like.

Another aspect relates to a mechanism for applying tension as a function of engine torque to a flexible member, such as a belt, chain or the like.

Another aspect relates to a mounting system for a boat drive including a gimbal structure, such as a gimbal ring to support the boat drive relative to a boat for movement of the boat drive relative to the boat about at least two different axes, a trim fastening mechanism for fastening the boat drive to the gimbal structure, the boat drive being pivotable about an axis including the trim fastening mechanism, and a trim adjusting mechanism for holding the boat drive at an angular relationship to the gimbal structure.

Another aspect relates to a mounting system for a boat outdrive that facilitates mounting and demounting of the outdrive.

Another aspect relates to a system for mounting an outdrive to a boat which enables mounting and demounting of the outdrive entirely from outside the boat, i.e., without having to disconnect fasteners and the like inside the boat.

Another aspect relates to a boat drive including input and output shafts, variable ratio sprockets relatively coupled relative to the shafts to rotate at the same speed as the respective shafts, and a flexible coupling member, such as a belt, mounted on the sprockets for coupling power between the shafts.

Another aspect relates to a power coupling system including input and output shafts, a flexible coupling mechanism for coupling the shafts to transfer power therebetween, a spacing device between the shafts for spacing the shafts relative to each other, and wherein the spacing device is a relatively nonrigid material.

In a preferred embodiment, the spacing mechanism identified in the preceding paragraph is a plastic material.

According to another aspect, a sprocket assembly for a flexible power transfer member, such as a belt, chain or the like, includes a sprocket for supporting the flexible power transfer member and for transferring power to and/or from the belt, bearings for supporting the sprocket for rotation, a seal to exclude water and to retain lubricant for the bearings and sprocket, and a cone clutch for selective engagement to transfer power between a further shaft and the sprocket.

It will be appreciated that the various features of the invention may be employed alone and/or in combination with other features in plastic outdrive systems and in other drive systems for boats and/or other vehicles.

The foregoing and other objects, features, advantages and embodiments of the invention will become apparent as the following description proceeds.

The following description and the annexed drawings set forth in detail certain illustrative embodiments of the invention, these being indicative, however, of but a few of the various ways in which the principles of the invention may be employed. It is intended that the invention only be limited by the scope of the claims and the equivalents thereof.

BRIEF DESCRIPTION OF THE DRAWINGS

In the annexed drawings:

FIG. 9 is a side elevation view, partly in section, of an upper sprocket assembly;

FIGS. 10 and 11 are, respectively, side elevation view, partly in section, and end view of a dynamic tensioning upper sprocket assembly;

FIGS. 12A and 12B are, respectively, schematic illustrations depicting operation of the dynamic tensioning mechanism of the sprocket assembly of FIGS. 10 and 11;

FIG. 13 is a side elevation view, partly in section, of the lower sprocket assembly;

FIGS. 14, 15, and 16 are, respectively, side, front and back views of the outdrive housing;

FIGS. 14A and 16A are, respectively, fragmentary side and back views of the bottom area of the outdrive housing showing a winged skeg arrangement of an alternate embodiment of the invention;

FIGS. 17 and 18 are, respectively, end and section views of the trim, tilt and kickup actuator assembly;

FIG. 20 is a schematic illustration of a locking mechanism to prevent inadvertent kickup of the outdrive power leg when operating to provide reverse thrust.

DETAILED DESCRIPTION OF THE INVENTION

Introduction

Figure 1A:
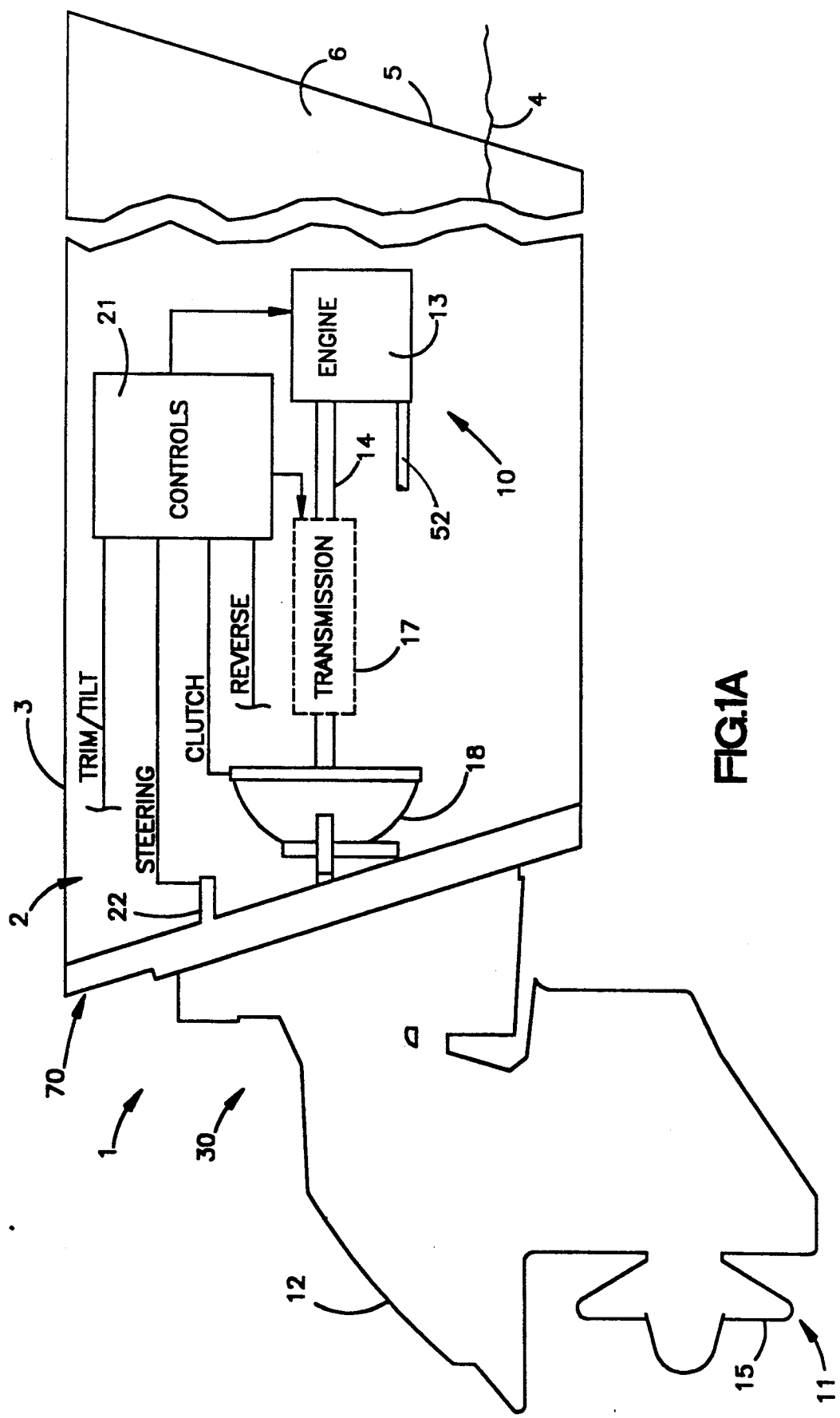
FIGS. 1A and 1B are schematic illustrations of a boat and an inboard/outboard drive system therefor, including an outdrive according to the invention.
Figure 1B:
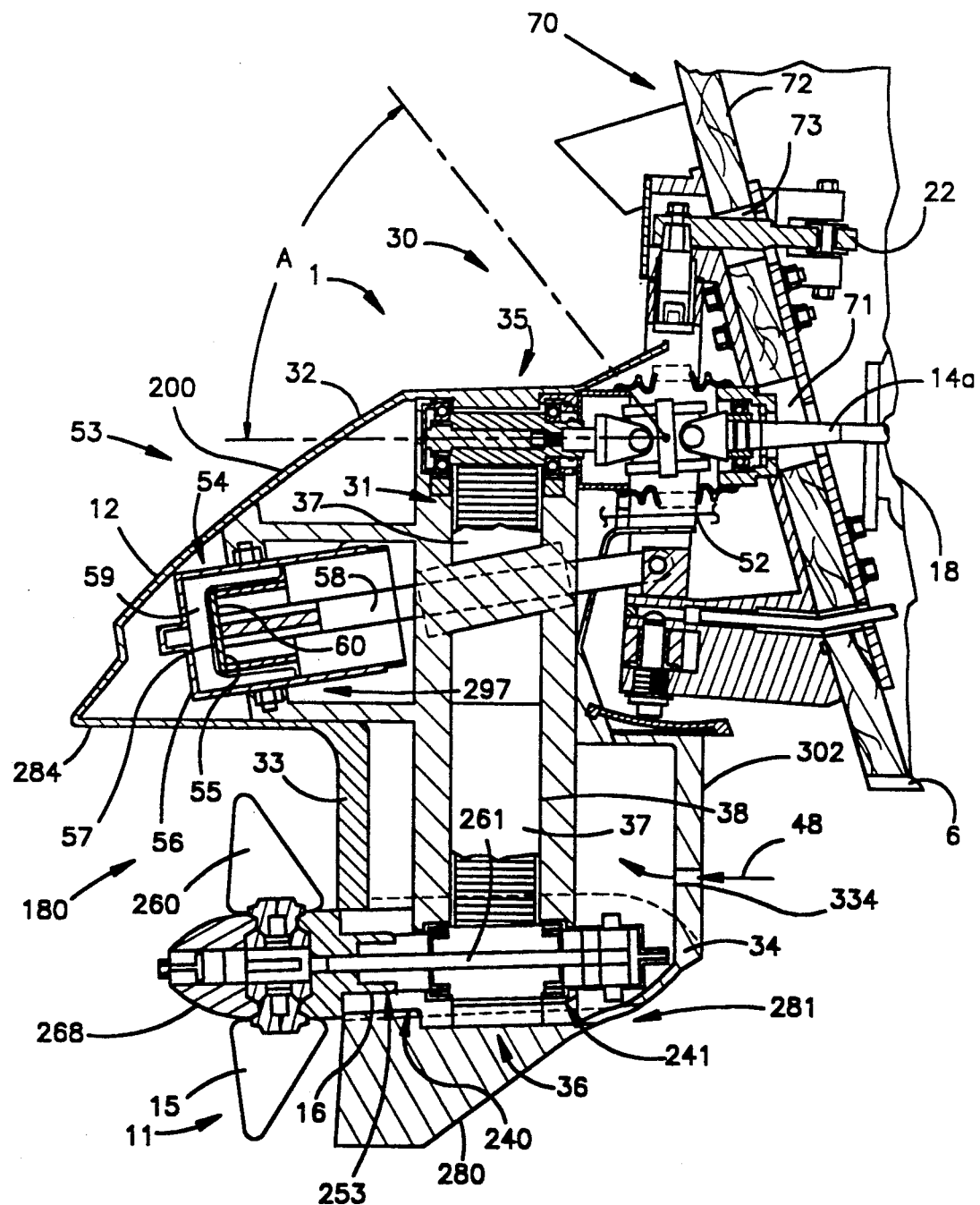
Figure 2:
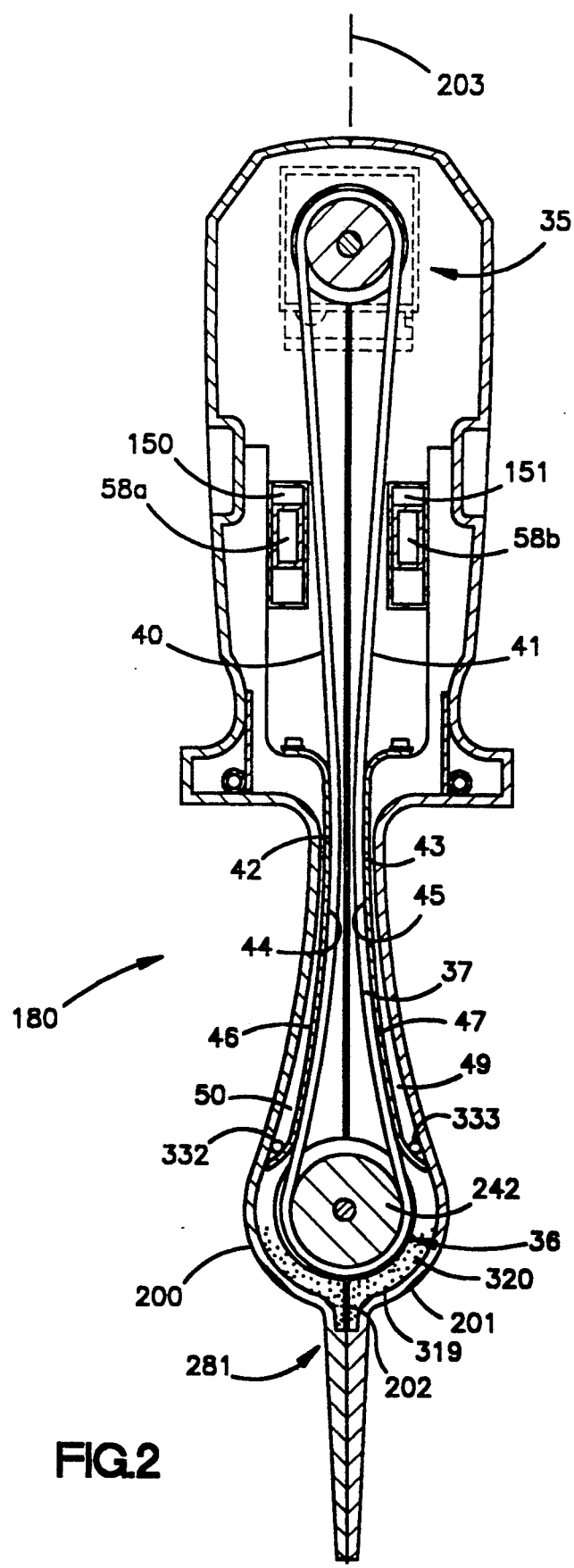
FIG. 2 is a front elevation view partly in section of the belt drive system with the back benders.

Referring in detail to the drawings, wherein like reference numerals designate like parts in the several figures, and initially to FIGS. 1A, 1B and 2, a power coupling system 1 in accordance with the preferred embodiment of the present invention is illustrated coupled in a drive system 2 of a boat 3. An exemplary waterline is represented at 4 near the bow 5 of the hull 6 of the boat 3 when the boat is moving at or approximately on a plane. When the boat is at rest or is not at plane, the stern will be lower in the water than is illustrated, as is conventional.

In the preferred embodiment, which is exemplary of the invention, the drive system 2 is of the inboard/outboard type, including a power supply 10, an output mechanism 11, the power coupling system 1, and a housing 12. The housing 12 provides functions of structural support, spacing and enclosing for the power coupling system 1 and the output mechanism 11. As was mentioned above, the power coupling system 1 of the invention may be employed with other types of drive systems for boats or other vehicles.

As is described in further detail below, the invention employs a number of novel features. Several of these include a unique kickup feature, back bending of a drive belt, techniques for pretensioning and dynamic tensioning of a drive belt, and an hydraulically actuated cone clutch mechanism. Furthermore, a number of features in combination can be employed in accordance with the invention to provide an efficient and cost effective power coupling system for a boat drive or the like; and a number of these features include a plastic housing, a belt drive, a back bending technique for the belt drive, low pressure cylinders made of plastic for trim and kickup features, an hydraulically actuated cone clutch, and the ability to employ a reversible propeller. Several exemplary advantages of using primarily plastic material for the power coupling system of a boat drive include the elimination of corrosion problems, avoiding problems due to galvanic corrosion interaction caused by anti-fouling paints, due to stray electric currents, and/or other sources, and/or the like, facility and low cost of manufacturing, lightness of weight, and so on, to name but a few.

Since a belt drive is used in the power coupling system, the housing therefor can be made of plastic, which is less stiff than metal. Back bending the belt, which is described in detail below, enables the power leg of the power coupling system, i.e., that portion which is in the water, for example, to have a relatively narrow profile or cross-sectional area transverse to the direction of travel through the water; and this characteristic improves hydrodynamics of the power leg, thus reducing drag in the water.

In the exemplary (and preferred) embodiment of the invention, then, the power supply 10 is an engine 13. The engine has a drive shaft 14 which is rotated by the engine to provide power that ultimately causes rotation of the propeller 15, which is mounted on a propeller shaft 16.

If desired, although not necessarily preferred, a conventional transmission 17 may be included in the power coupling system 1 for the conventional purposes provided by a transmission. For example, the transmission may include reverse, neutral and forward gears to determine the direction of rotation of the propeller 15 and/or whether it rotates at all, as the drive shaft 14 is rotated. The transmission 17 also may include additional gears or other mechanism to change the ratio of the rotational speed of the propeller 15 with respect to the rotational speed of the drive shaft 14. The transmission is shown in dotted outline in FIG. 1A because it is possible that such transmission may be omitted in the case that it is desired to have direct coupling of the engine 13 to the outdrive portion of the power coupling system 1.

A clutch 18 also may be included in the power coupling system 1 of the drive system 2. The clutch 18 may be a conventional clutch that serves conventional clutch functions. Exemplary clutches may be an automotive clutch, a dog clutch, or some other clutch of conventional or special design, as may be desired. The clutch 18 may be operated in conventional fashion, for example, selectively to couple or to decouple the engine drive shaft 14 relative to the other parts of the power coupling system 1. Coupling would be effected, for example, when it is desired to turn the propeller 15 in order to move the boat 3. Decoupling would occur, for example, when the engine 13 is started, when it is desired to allow the engine 13 to run without turning the propeller 15, when gears in the transmission 17 are shifted, etc.

The power coupling system 1 may be considered as including the drive shaft 14, propeller shaft 16, transmission 17 and clutch 18, as those parts cooperate in the transmission of power from the engine to the propeller. The power coupling system 1 also includes other portions, as will be described further below.

A number of controls 21 (and, if desired, displays) of conventional electrical, mechanical, hydraulic and/or pneumatic type (or other type), may be included to operate and/or to control various functions of the drive system 2. For example, the controls 21 may be operated by the boat operator to start the engine 13 and/or to determine the engine speed. The controls 21 also may be coupled to the transmission 17 and to the clutch 18 to adjust gears and/or clutching functions in conventional fashion. Further, the controls 21 may be coupled to a power steering actuator which operates a tiller arm 22 to steer the boat. Still further, the controls 21 may be coupled to the power coupling system 1 to control trim and tilt functions, as are described in further detail below as well as locking to avoid tilting when driving in reverse. The controls 21 may include mechanical, electrical, hydraulic, and/or pneumatic controls and/or linkages, and so on, which are available to effect the desired control functions of the drive system 2. The controls 21, engine 13, transmission 17 and clutch 18 may be mounted in the boat 3 in a conventional fashion and are operative, for example, in conventional fashion, to supply power in the form of rotational energy via the various other portions of an outdrive 30 of the power coupling system 1 to rotate the propeller 15.

The Outdrive 30

A significant component of the outdrive 30 is the housing 12, and according to the preferred embodiment and best mode of the invention that housing is made of plastic material or of a material that has the characteristics of plastic material. Since plastic ordinarily is less stiff than metal, such as an aluminum housing, and tends to creep more than metal would, a belt drive assembly 31 is used to couple power from the upper housing portion 32 through the down leg 33 portion of the housing to the lower housing portion or torpedo 34.

The belt drive assembly includes a pair of upper and lower sprockets 35, 36 and a flexible belt 37, for example of rubber or polymer material, which is rotated about and between the sprockets. The belt 37 runs in a chamber 38 in the housing 12. A belt drive, especially the belt itself, is more forgiving as to positional alignment or tolerances than is a gear and shaft drive typically used in conventional outdrives. To avoid the need for two down legs, as is shown in the above U.S. Pat. No. 3,951,096, while minimizing the cross-sectional area of the down leg 33 required to house the legs 40, 41 (FIG. 2) of the belt 37 and presented transversely of the direction of travel through the water, the belt legs are bent toward each other. Such bending is effected by skid plates or back benders 42, 43, which in the preferred embodiment are of metal material that have smooth surfaces 44, 45 over, on, across, etc., which the belt 37 slides.

It will be appreciated that a belt 37 is but one form of flexible coupling member that may be employed in the invention, as was mentioned above. Preferably that flexible coupling member is in the form of a continuous loop or endless loop and is able to transmit rotary motion, torque, and, thus, power from the power input portion to the power output portion of the outdrive 30.

Heat may be developed in the outdrive 30, for example by the belt 37 as it is bent and flexed by the back benders 42, 43 and the sprockets 35, 36 and as it slides on the back benders. Heat also may be developed at other parts of the outdrive, for example, at the respective sprockets 35, 36 due to friction losses or the like. Against the outside surfaces 46, 47 of the back benders (i.e., outside relative to inside the belt chamber 38) a cooling flow 48 of water is provided through flow paths 49, 50, to remove heat from the back benders and, thus, from the outdrive.

A fluid 51 in the belt chamber, which provides a lubricating function for the belt and, if desired, for the sprockets 35, 36, transfers heat from the outdrive to the back benders 42, 43, for example at the surfaces 44, 45. Whether the fluid 51 provides boundary lubrication or fluid film lubrication, e.g., depending on thickness of the lubricant between the belt and back bender surfaces 44, 45, it has been found that there is adequate heat transfer to the back benders. Therefore, the belt and/or other related parts in the outdrive will not overheat.

Preferably the back benders are made of a relatively efficient thermally conductive material, such as metal, especially aluminum. The cooling flow 48 of water flowing against the outside surfaces 46, 47 of the back benders conducts the heat away from the back benders and from the outdrive. The source of the cooling water flow 48 may be from the water in which the boat is immersed. For example, an opening in the housing 12 may provide an inlet for such water. Since the water flow 48 usually would have adequate cooling capacity after having removed heat from the back benders, the flow paths 49, 50, may be joined at 52 (FIG. 1B) and directed to couple the water flow to the engine 13 for cooling the engine in conventional fashion.

An exemplary trim, tilt and kickup mechanism provided the outdrive 30 is shown at 53. Other conventional trim, tilt and kickup mechanisms alternatively may be used. The mechanism 53 includes a relatively large area, relatively low pressure actuator 54, which has a piston 55, cylinder 56, rolling diaphragm 57 and rod 58. By changing hydraulic fluid pressure in the chamber 59 of the actuator 54, the piston 55, diaphragm 57 and rod 58 are moved relative to the cylinder 56 to trim the angle of thrust of the outdrive 30, more specifically of the propeller 15, and/or to tilt the outdrive, e.g., for servicing, trailering, etc.

In response to application of a kickup force against the outdrive 30, the outdrive tends to tilt out of the way. The cylinder 56 then moves relative to the piston 55 and rod 58 tending to create a vacuum in the actuator chamber 59. The force required to kickup the outdrive can ramp up to that required to draw the vacuum, namely the product of atmospheric pressure times (against) the outside surface 60 of the piston 55 and then remains constant. After the kickup force is removed, the weight of the outdrive 30 and the atmospheric pressure acting against the outside surface of the piston 55 urging it into the cylinder 56 serve as a restoring force promptly to return the outdrive to the pre-kicked up orientation.

In accordance with the present invention, the outdrive 30 is included in the power coupling system 1 and, for convenience, also may be considered to include the output mechanism 11, namely, the propeller 15. The outdrive 30 is mounted at the stern 70 of the boat 3. The engine drive shaft 14, or at least an extension portion 14a thereof on the output side of the clutch 18 (if such clutch, the transmission, or some other part(s) were used between the engine and the outdrive), passes through an appropriate opening 71 in the stern transom 72 of the boat to couple rotary power to the outdrive 30, as is described in greater detail below. Moreover, steering functions for the outdrive 30 are effected via the tiller arm 22, which also is coupled to the outdrive 30 via an appropriate opening 73 in the transom 72. Other connections such as for hydraulic lines, pneumatic lines, mechanical connections, and electrical connections, etc., also may be provided to the outdrive 30 via appropriate openings through the rear transom 72 of the boat or may be otherwise provided to the outdrive 30, as may be desired.

Outdrive Mounting Structure 80

Referring, now, to FIGS. 1 and 3-8, the outdrive 30 includes a mounting structure 80 for mounting and supporting the outdrive from the boat 3. The mounting structure 80 is designed to permit movement of the outdrive 30 about the tilt axis T and about the rudder axis R, while supporting the outdrive 30 from the boat 3 and also permitting connections of the drive shaft 14a, tiller arm 22, and other hydraulic, pneumatic, water and/or electrical lines, for example, through the transom 72 of the boat. Rudder function may be effected by rotating the outdrive in response to torque applied by the tiller arm 22; steering function primarily is accomplished as a function of the direction of thrust by the propeller 15 and/or as a function of rudder action effected by submerged surface area portions of the outdrive 30 that are relatively long in the direction of travel through the water compared to the thickness or width dimension thereof transverse to the water flow direction.

Figure 3:
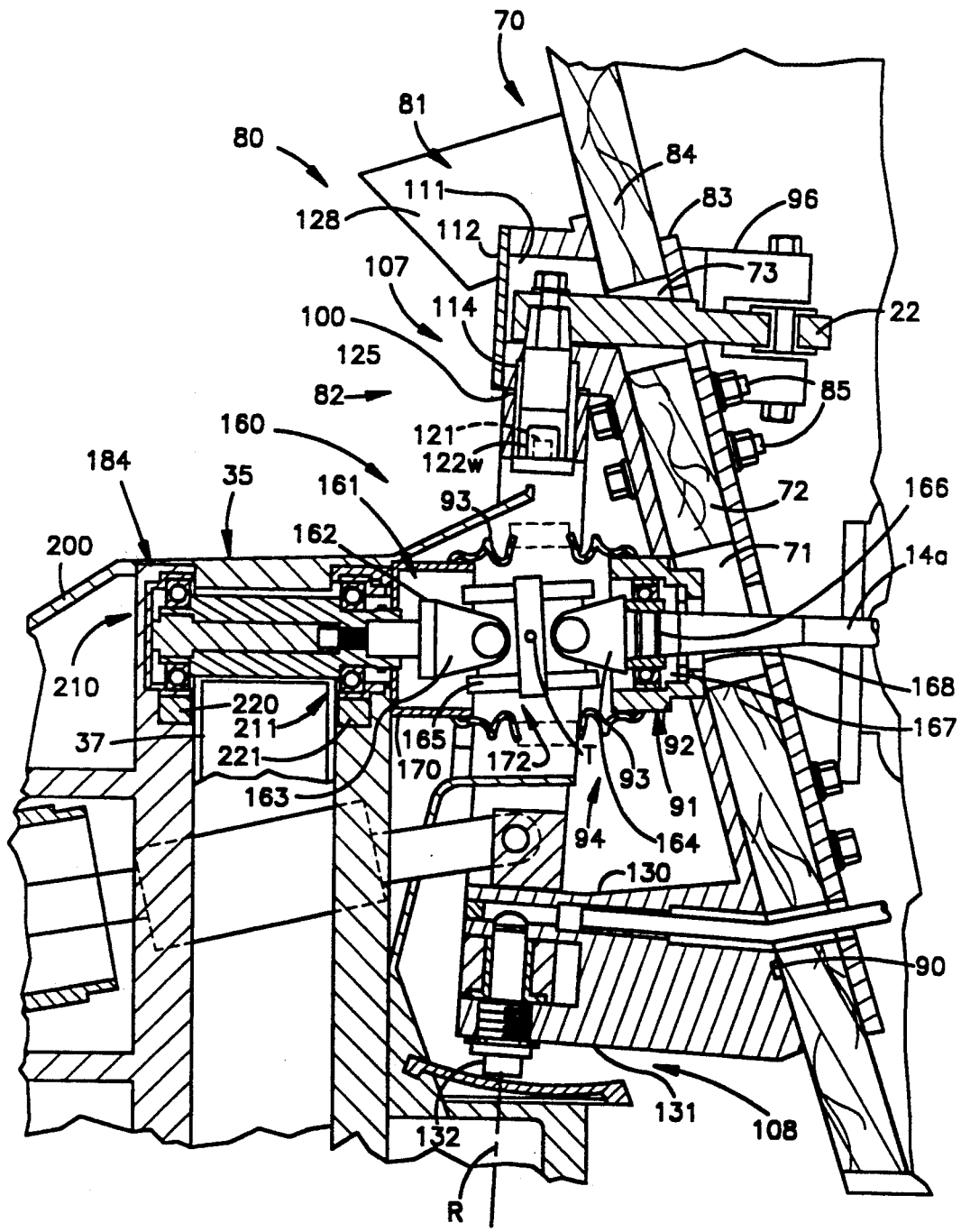
FIG. 3 is a schematic section view looking in side elevation showing the coupling of the outdrive to the transom of a boat.
Figure 4:
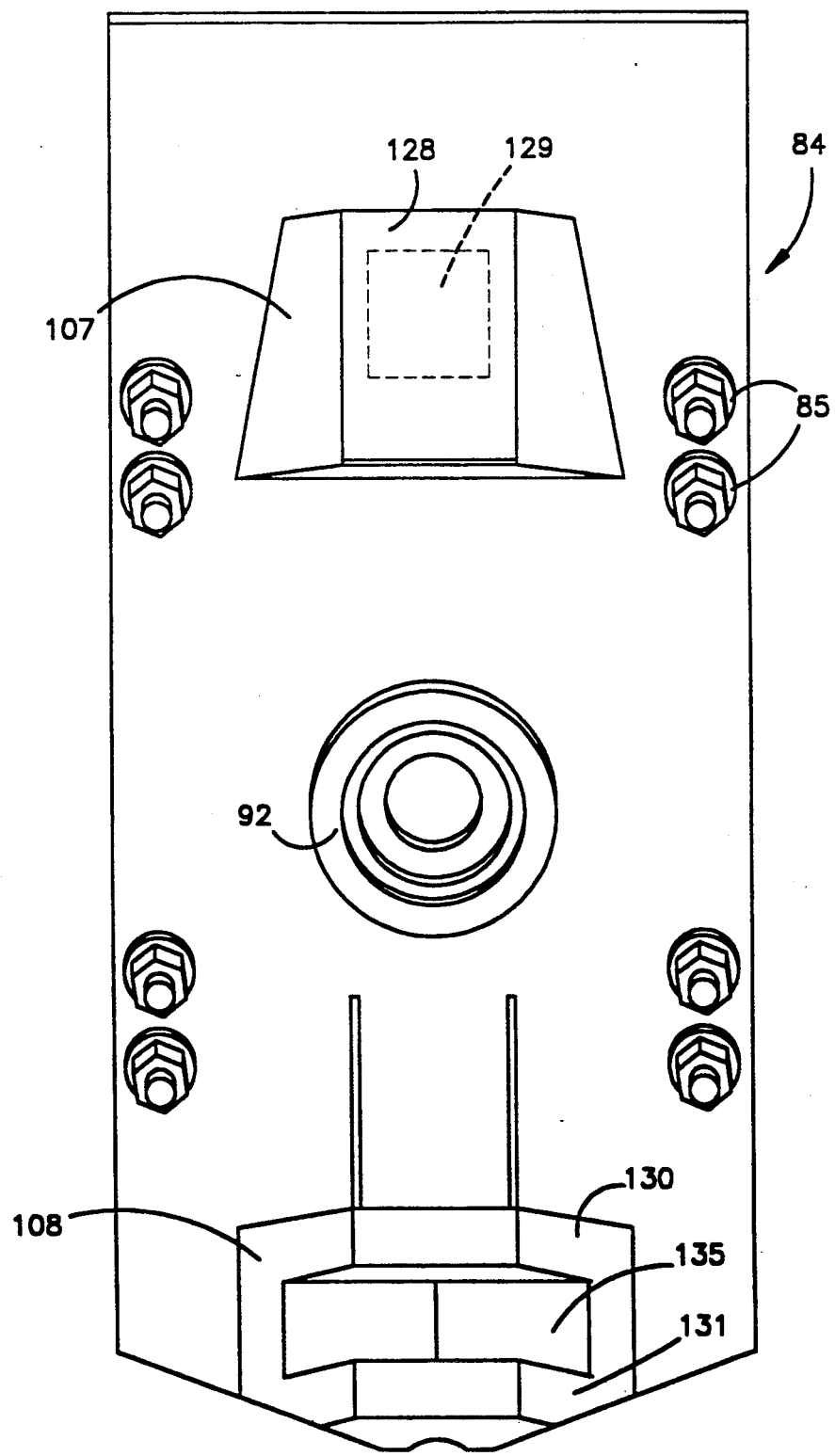
FIG. 4 is a plan view of the outer transom housing.

The mounting structure 80 includes a transom housing portion 81 directly secured to the boat 3 and a gimbal mounting portion 82, which interfaces between the transom housing portion 81 and the outdrive housing 12 and permits desired tilting and rudder movement thereof. The transom housing portion 81 includes an inner transom housing 83 and an outer transom housing 84. The inner transom housing 83 and the outer transom housing 84 preferably are coupled to each other and to the boat transom 72 in sandwich relation, as is seen in FIG. 3, for example. The sandwich connection provides substantial reinforcement of the transom 72 to provide support for the outdrive 30. The inner and outer transom housings 83, 84 may be plastic, metal or other material. The inner and outer transom housings 83, 84 and the stern transom 72 are secured together by bolt and nut fasteners 85, as is seen in FIG. 3, and seals are provided as needed to prevent water leakage into the boat. The seal would be external of the fasteners, e.g., circumscribing them, so that the fasteners ordinarily remain dry. Conventionally, openings are provided in the inner and outer transom housings 83, 84 and through the transom 72 for passing the tiller arm 22 through tiller opening 73 and for passing the drive shaft 14a through opening 71 between the inside and outside of the boat.

A main gasket 90 extends about the outer transom housing 84 facing the boat and prevents water leakage into the boat. The drive shaft 14a passes through a gimbal bearing 91, which is enclosed in a gimbal bearing housing 92 that is part of the outer transom housing; and the drive shaft is covered by a water tight flexible boot 93, for example, of rubber, at the connection thereof to the power input 94 for the outdrive 30. The gimbal bearing housing 92 and boot 93 prevent water leakage at the drive shaft 14a. The tiller opening 73 is made water tight to prevent water leakage into the boat, as is described further below.

Figure 5:
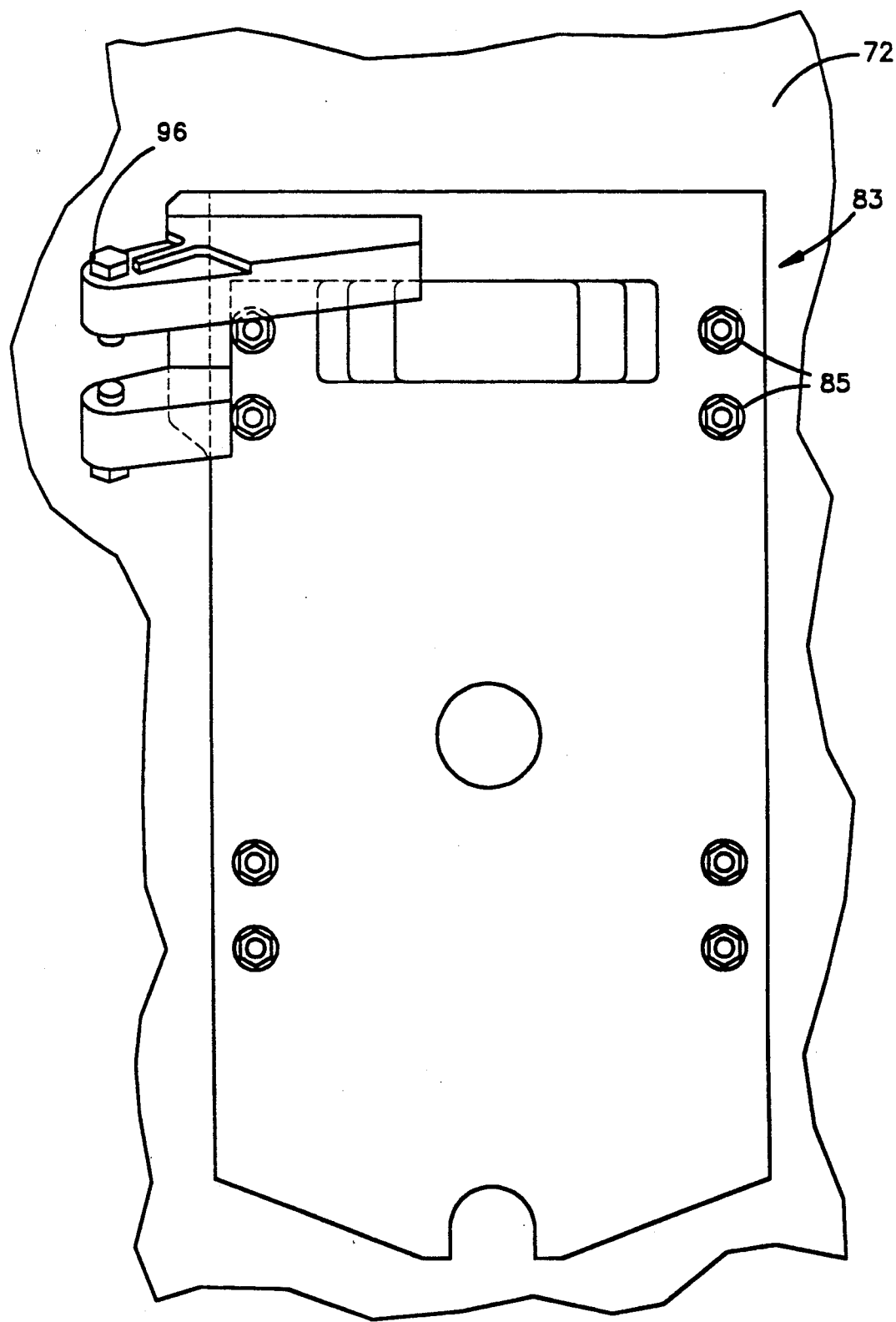
FIG. 5 is a plan view of the inner transom housing.
Figure 6:
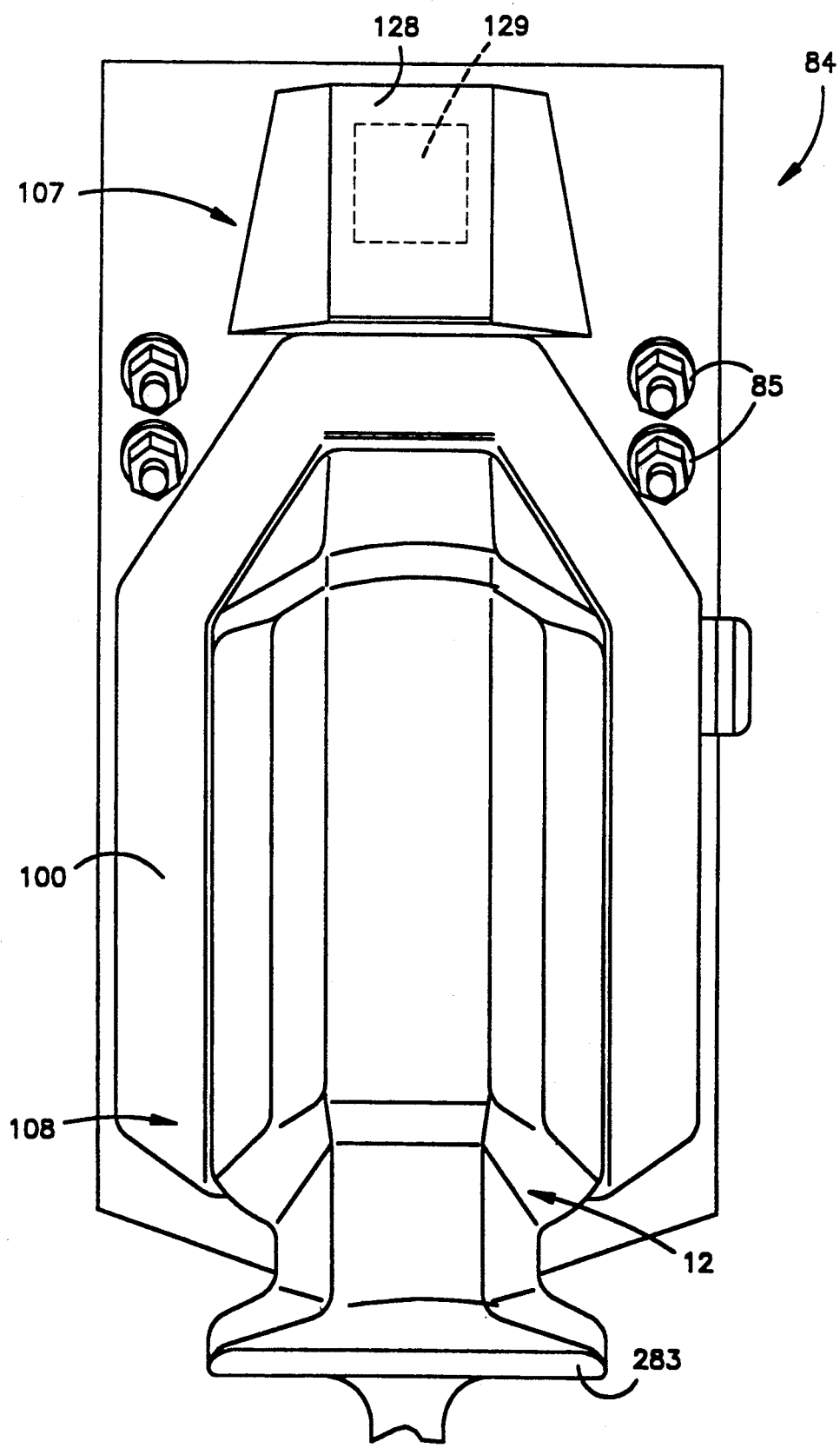
FIG. 6 is a plan view of the gimbal ring positioned in the outer transom housing.
Figure 8:
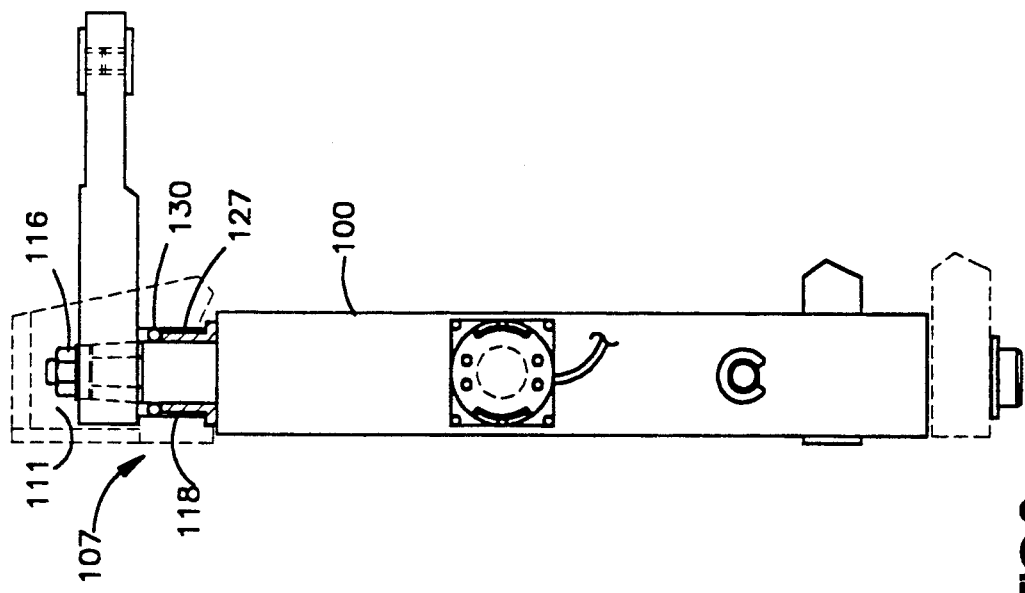
FIG. 8 is a side elevation view of the gimbal ring.
Figure 7:
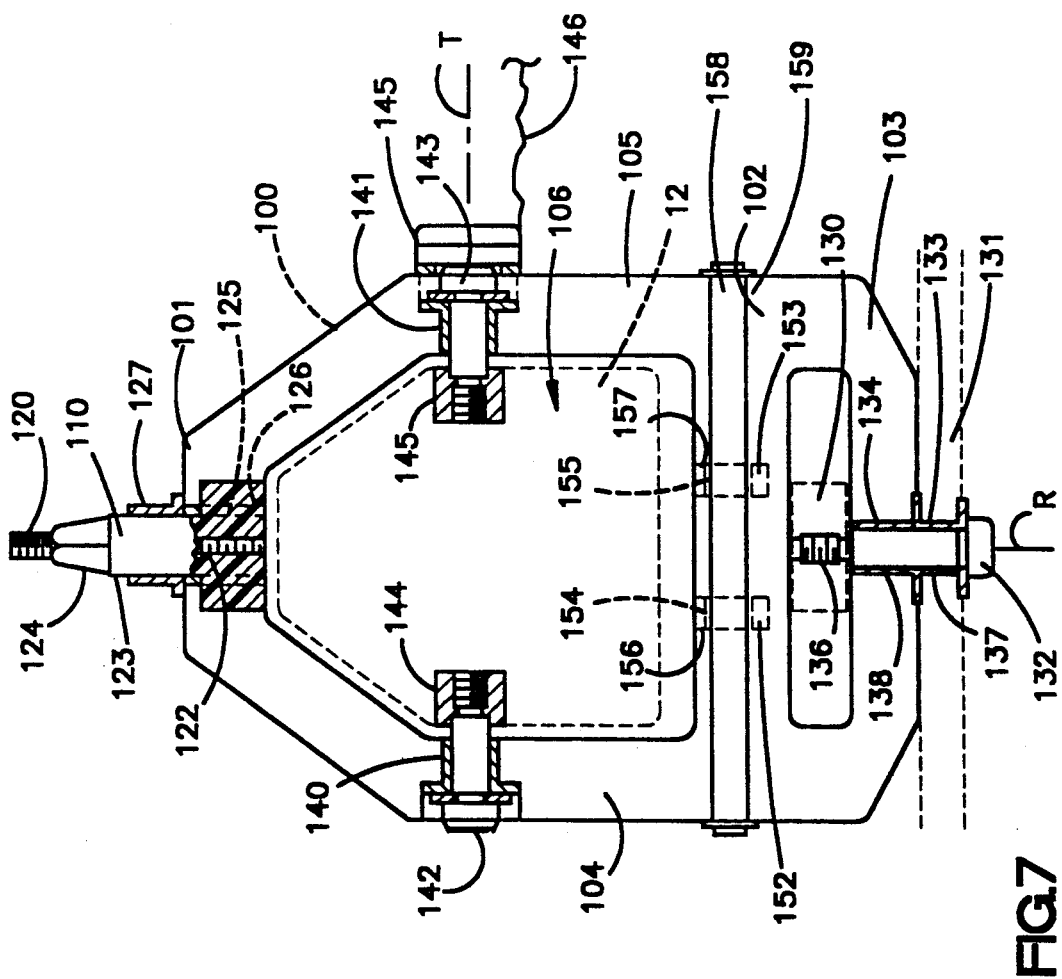
FIGS. 7 is a front elevation view of the gimbal ring.
Figure 7A:
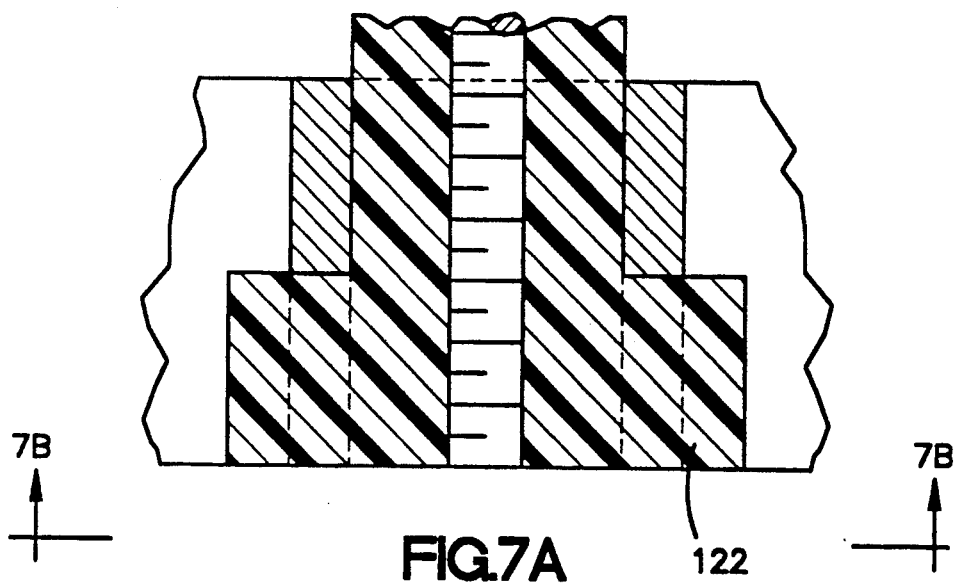
FIG. 7A is an enlarged side elevation-fragmentary view of the gimbal ring and upper rudder pin.
Figure 7B:
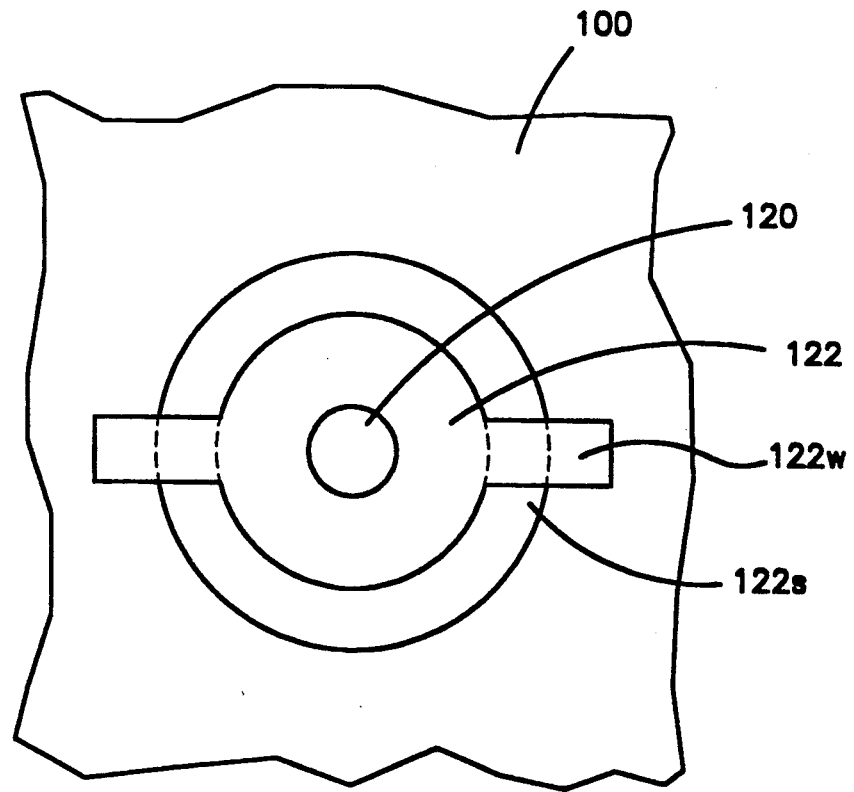
FIG. 7B is a fragmentary bottom view of the gimbal ring and upper rudder pin of FIG. 7A.
Figure 18:
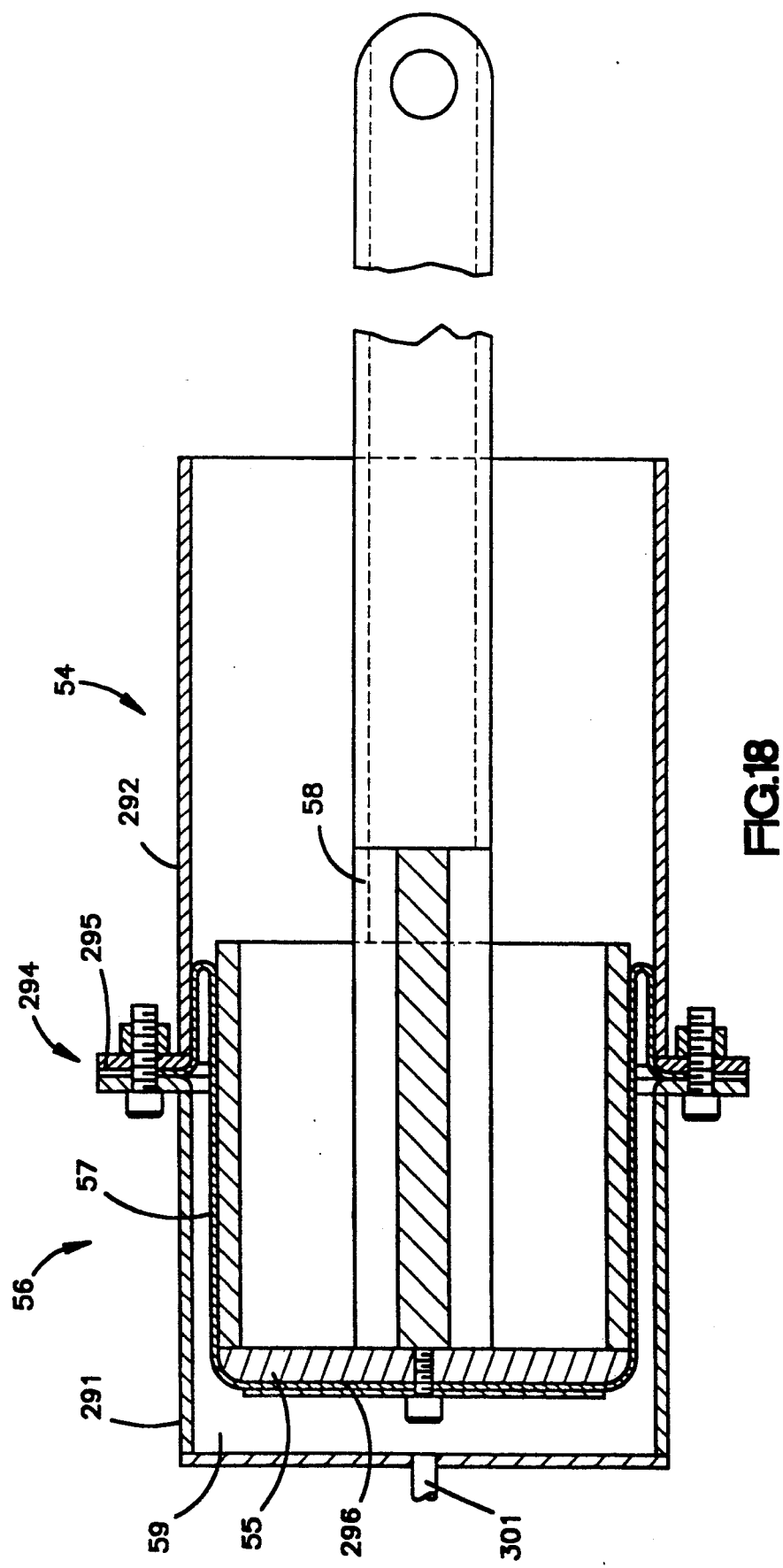

Various parts of the drive system 2 may be coupled to the inner transom housing 83, such as engine mounts, power steering cylinders, fasteners to secure plumbing conduits, such as engine cooling, hydraulics, exhaust, etc., e.g., for support and/or positioning. As an example, a bracket 96 for mounting a power steering cylinder (not shown) that moves the tiller arm 22 to rotate the outdrive is shown in FIG. 5. Such power steering cylinder may be controlled by operation of controls 21 by the boat operator in conventional manner.

The outer transom housing 84 supports the rudder functions (steering functions) for the outdrive 30. The outer transom housing 84 also provides a load path from the outdrive 30 to the boat 3.

The gimbal mounting portion 82 includes a gimbal ring 100 to which the outdrive housing 12 is connected for mechanical support. The gimbal ring 100 (FIGS. 6-8) preferably is made of plastic (which is non-corrosive) or aluminum material, although other materials that have appropriate strength, corrosion resistance and weight characteristics may be used. The gimbal ring 100 has top, middle and bottom straps or arms 101-103, side straps or arms 104, 105, and a central opening 106 through which part of the housing 12, drive shaft 14a and/or other portions of the outdrive may pass. It is mounted in and between an upper support 107 and a lower support 108 of the outer transom housing 84 in a manner that secures the gimbal ring relative to those supports while permitting rotation of the gimbal ring about the rudder axis R.

At the top strap 101, the gimbal ring 100 is attached to the upper support 107 by the upper rudder pin 110. Such connection is provided with a water tight seal to prevent water entering into a tiller chamber 111 that faces tiller opening 73. The tiller chamber 111 is enclosed between upper, lower and side walls 112-114 seen in FIG. 3, for example. The upper wall 112 has an access opening (not shown) for access into the chamber 111 to fasten and unfasten the nut 116 secured to the threaded end of the upper rudder pin 110. The lower wall 113 has a circular cross sectional opening 118 through which the upper rudder pin passes for securing to the tiller arm 22.

As is seen in FIGS. 3, 7, 7A, 7B and 8, the upper rudder pin 110 preferably is reinforced by a metal pin 120 or bolt, for example, stainless steel, that has adequate strength characteristics to carry the clamp load of the nut 116. Such pin 120 has a head end and a thread at the other, as is illustrated in FIG. 3. Preferably a threaded opening 121 is formed part way into the head end to facilitate removing the upper rudder pin 110. Molded about and to the pin 120 is a cylindrical body 122 with a keying or locking feature. Such keying feature may be wings, extending tabs, or the like shown at 122w that are operative to lock the upper rudder pin 110 to turn the gimbal ring 100. Also molded about and to the pin 120 nearer the center of the axial length thereof is a generally cylindrical body 123, which is intended to rotate in a circular cross sectional opening provided in the lower wall 113 of the upper support of the outer transom housing 84, so that the rudder pin 110 and gimbal ring 100 can rotate relative to the outer transom housing 84. Further, molded about and to the pin 120 near the top threaded end is a polygonal shape body 124, e.g., of hexagonal cross section, and preferably being tapered from one end toward the other to facilitate insertion and tightening into a correspondingly shaped mating opening in the tiller arm 22 and to facilitate separating such body from the tiller arm opening when desired. The bodies 122, 123, 124 may be made of plastic material that is molded directly to the pin 120 using, for example, insert molding techniques.

An opening 125 is formed in the top strap 101 of the gimbal ring 100. A bushing 126 fits in that opening 125, and the keyed cylindrical body 122 of the rudder pin 110 fits securely in that bushing as is illustrated in FIG. 3. The bushing 126 has reliefs in the wall thereof to pass the keys 122w into locking slots 122s formed in the gimbal ring. Further, a cylindrical pivot bearing 127 fits in the stepped cylindrical opening 110 in the lower wall or arm 113 of the upper support 107 of the outer transom housing 84. The cylindrical body 123 of the upper rudder pin 110 fits in such pivot bearing 127 for rotation. An o-ring seal 130 at the top end of the pivot bearing 127 prevents water leaking into the tiller chamber 111. Moreover, relatively close fit of the pivot bearing 127 with the cylindrical body 123 and relatively close fit of other portions of the upper rudder pin square body 122 with the square bushing 126, and relatively close fit of other parts of the upper rudder pin 110, gimbal ring 100 and wall 113 help prevent leakage of water into the tiller chamber 111 and into the boat 3.

With the gimbal ring 100 positioned in the manner illustrated in FIG. 3, with the outdrive 30 not yet coupled to the gimbal ring, and with the upper rudder pin 110 in place, as is illustrated, the nut 116 can be fastened onto the threaded end of the pin 120 to hold the gimbal ring to the upper support 107 of the outer transom housing 84. A cover 128 (also seen in FIG. 4) then can be installed to cover the opening 129 (FIG. 4) into the tiller chamber 111. As the nut 116 is tightened, the hexagonal body 124 is drawn into a correspondingly shaped opening in the tiller arm to make a secure connection therewith. Due to the features of the upper rudder pin 110 (including bodies 124, 122) and the connections thereof with the tiller arm 22 and with the gimbal ring 100, turning of the tiller arm will cause turning of the gimbal ring about the rudder axis R. Since the outdrive 30 is mounted to the gimbal ring 100, as is described in further detail below, such turning of the gimbal ring will turn the outdrive to steer the boat and to change the direction of thrust by the propeller 15. The arrangement of parts and the cooperative interaction thereof as was just described facilitates the assembly and disassembly of the gimbal ring and the tiller arm relative to the outer transom housing from outside the boat.

To remove the upper rudder pin 110, access to the nut 116 is provided by means (not shown) such as a removable plate 128 in the front wall of the chamber 111. The nut 116 can be removed. Thereafter, a u-shape jig can be placed beneath the head end of the upper rudder pin to place the legs of the jig in engagement with the bottom of the upper strap 101 of the gimbal ring. A screw then can be placed through an opening in a bridge portion of such jig and threaded into the countersunk opening 121 in the head end of the rudder pin 120. As such screw is tightened to bear against the bridge of the jig and to penetrate the threaded opening 121, the upper rudder pin 110 will be drawn out of secured relation with the tiller arm and will become free for removal. This removal action is analogous to that employed with a typical bearing puller type of device.

As is seen in FIGS. 1, 3, 4 and 7, the bottom strap 103 of the gimbal ring 100 is mounted to and between a pair of tines 130, 131 of the lower support 108 of the outer transom housing 84 and is held there by the lower rudder pin 132, which preferably is a shoulder screw. The screw 132 passes through opening 133 in the tine 131 and opening 134 in the strap 103, which fits in a space 135 between the tines 130, 131. The screw 132 is threaded securely into a threaded opening 136 in the upper tine 130. Bushings 137, 138 are located in the openings 133, 134 in the tine 131 and strap 103. The lower rudder pin 132 may be tightened to hold the overall assembly of the gimbal ring strap 103 to the lower support 108 of the outer transom housing 84 for securement therein while permitting rotation about the rudder axis R.

The side straps or arms 104, 105 of the gimbal ring 100 extend between the top and bottom straps or arms 101, 103 and have openings 140, 141 therethrough for connection to the housing 12 of the outdrive 30 by conventional pivot bolts, shoulder screws, or the like, which are generally designated 142, 143, respectively, at opposite sides of the gimbal ring. Such pivot bolts may be secured to threaded openings 144, 145 in the housing 12. Those threaded openings may be reinforced with metal material, if desired. Appropriate bushings, bearings, and the like also may be employed. The objective is to secure the housing 12 to the gimbal ring by such pivot bolts 142, 143 while permitting tilting of the housing 12 and apparatus therein about the tilt axis T. Preferably the pivot bolts 142, 143 are tightly secured to the housing 12 and rotate in the openings 140, 141 as the tilt angle of the housing 12 varies.

A conventional position sensor 145 may be mounted at one of the pivot bolts 142, 143 in conventional fashion. The position sensor 145 may be a device that produces an electrical signal representative of absolute position or relative position or movement of the outdrive relative to a fixed position, for example. Such position sensor may operate by detecting the tilt angle of the pivot bolt relative to the gimbal ring 100. Information concerning such relative tilt angle can be coupled electrically, as by leads 146, to the controls 21 for displaying the actual relative tilt angle to the boat operator or for use in automated trim adjusting equipment. An example of a position sensor is a device that has an electrical resistance characteristic which varies with respect to tilt angle; such a device may be, for example, a potentiometer type of device, such as one available from Allen-Bradley Company.

The middle arm or strap 102 of the gimbal ring 100 extends generally horizontally between the side straps 104, 105. The strap 102 provides a mechanism to which the trim, tilt and kickup mechanism 53 is attached to the gimbal ring 100. Such attachment enables the gimbal ring to serve as the structure against which the outdrive 30 may be urged to effect trim and tilt functions and also to receive force when the propeller 15 is turning to drive the boat in the water. Thus, forward thrust is applied via the mechanism 53 to the gimbal ring 100, which in turn transmits the forward thrust to the boat 3 to move the boat through the water.

As is seen in FIGS. 1, 2, 7 and 8, the rod 58 is bifurcated to portions 58a, 58b, which extend through passages 150, 151 in the housing 12 in isolation from the belt chamber 38. Therefore, water which may enter the passages 150, 151 will not enter the belt chamber 38. The ends 152, 153 of the rods 58a, 58b have openings 154, 155 therein and fit into slot-like openings 156, 157 in the middle strap or arm 102 of the gimbal ring 100. A locking rod 158 placed through a locking passage 159 in the strap 102 through the openings 156, 157 of the bifurcated arms 58a, 58b holds the rod 58 to the gimbal ring. The bifurcated arrangement described facilitates coupling the rod 58 to the gimbal ring 100 without interfering with the belt 37.

Power Input Mechanism 160

Referring to FIG. 3, mechanical power is supplied the outdrive 30 via the outdrive power input 160, which includes a conventional universal joint 161, the gimbal bearing assembly 91, engine drive shaft 14, 14a as an input shaft, and a rotatable shaft 162 at the output side of the universal joint. The universal joint 161 is a conventional device having respective input and output connectors 163, 164, which are respectively coupled to the drive shaft extension portion 14a and rotatable shaft 162 and are coupled to each other via the universal joint housing 165. As is conventional, the universal joint 161 couples rotary motion between the input and output connectors 163, 164 thereof while also permitting relative movement of those connectors in one or more planes and/or along one or more axes. The center of pivot of the universal joint 161 is located at the intersection of the rudder axis R and the tilt axis T. This arrangement permits freedom of rotation for the outdrive 30 about the rudder axis R and/or tilt axis T without interfering with the coupling of rotary power or torque through the universal joint 161.

The gimbal bearing assembly 91 includes a stepped cylindrical gimbal bearing housing 92. Preferably the gimbal bearing housing 92 is part of the outer transom housing 84. The gimbal bearing 91 is self-centering in the gimbal bearing housing 92. O-ring seals 166 on the drive shaft 14a at the gimbal bearing 91 retain lubricant in the gimbal bearing 91, and/or prevent dirt from entering the gimbal bearing. A lip seal 167 is positioned between the drive shaft 14a and the opening 168 in the housing 92 through which the shaft 14a passes into the housing. The lip seal 167 prevents lubricant in the housing 92 exiting through the opening 168 and prevents dirt, water or other material from outside the housing entering the same.

A power input chamber 170 of the housing 12 circumscribes the connector 164 of the universal joint 161 and part of the shaft 162. The flexible boot 93 circumscribes the universal joint 161 and associated parts and is fastened between the outdrive housing 12 at the power input chamber 170 and the gimbal bearing housing 92 primarily to prevent water and dirt from entering the area 172 where the universal joint and associated parts are located. The flexible boot prevents water from entering such area 172 and from there gaining access into the boat. The flexible boot 93 permits the outdrive 30 to tilt about tilt axis T and to rotate about rudder axis R while still maintaining the function of enclosing the area 172.

The gimbal bearing 91 facilitates aligning of the drive shaft 14 and/or the extension portion 14a with the universal joint 161. The engine is aligned to the gimbal bearing. The gimbal bearing provides for support of the shaft and provides a gimbal function to facilitate alignment and to accommodate slight misalignment of the engine drive shaft with the universal joint.

Outdrive Power Leg 180

The outdrive 30 includes a so-called power leg portion 180 intended to transfer or to couple power received via the outdrive power input 160 to the propeller 15. In the illustrated embodiment of the invention, the propeller 15 is a constant pitch propeller. Therefore, rotation of the propeller in one direction will tend to drive the boat forward and rotation of the propeller in the opposite direction will tend to drive the boat in reverse direction. Reversing of the propeller rotation direction can be achieved by appropriate adjustment of the transmission 17, as is conventional. Alternatively, other means may be provided to change or to reverse the pitch, rotational direction and/or direction of thrust of the propeller 15.

Briefly referring to FIG. 20, a locking mechanism 500 for locking the outdrive in fixed position to prevent inadvertent kickup action when the propeller is operating to drive the boat in reverse direction is illustrated. The locking mechanism 500 includes a modified lower rudder pin 501 mounted in the lower support 108 of the outer transom housing. The lower rudder pin includes a movable plunger 502 slidable in a chamber 503 within the lower rudder pin 501. A spring 504 spring loads the plunger 502 to a withdrawn condition. However, in response to application of fluid pressure to the a pressure chamber 505 in the lower rudder pin, the plunger is forced to move against the spring 504 so as to protrude through the bottom of the lower rudder pin and to lock into a notch 506 in a notch plate 507. The notch plate 507 is fixedly carried on the housing of the outdrive power leg. Plural notches 506 are provided in the notch plate 507 so that the plunger 502 can fit into a respective notch substantially without regard to the particular trim angle at which the power leg is oriented.

In operation of the locking mechanism, fluid is provided to the pressure chamber 503 via fluid line 508 when it is intended to operate the propeller in reverse direction, i.e., to move the boat in reverse direction. Such fluid pressure may be supplied in response to actuation of a gear shift and/or controls 21 associated with the drive system for the boat. In response to such pressure the plunger is extended from its previous retracted position against the force of the return spring 504 so as to enter, to engage, and to lock into a respective notch opening 506 in the notch plate. When the propeller tries to pull the boat backwards, the outdrive will not kickup due to the locking action of the locking mechanism 500. When the gear shift is moved out of reverse gear, the fluid pressure in the pressure chamber 503 would be relieved; the plunger 502 would be withdrawn into the lower rudder pin under the force exerted by the return spring 504; and the outdrive then would be free to kickup if necessary upon striking an object.

Water spray may be directed to the area of the notch openings 506 through a water intake opening 509 (through the anti-ventilation plate, which is described below [reference number 283]) to keep them clean as the boat moves through the water. Such cleaning water flow or spray flows through a chamber area 510. A drain 511 may be provided to remove such sprayed water. For convenience, said drain 511 may pass said cleaning water out through an opening(s) (not shown) in the side(s) of the anti-ventilation plate 283; or other convenient draining flow path may be provided.

The housing 12, which encloses the power leg 180 preferably is formed of plastic material, which has a lower degree of stiffness than metal. The flexible member 37 is employed to transfer power or torque in the power leg 180. Such flexible member may be a belt, a chain or some other flexible member. Preferably the flexible member 37 is in the form of an endless loop. The advantage of using such a flexible member is the forgiveness or forgiving nature thereof in that precise alignment and positioning of parts, e.g., the upper and lower sprocket assemblies 35, 36 on which the flexible member 37 is mounted, for example, do not have to be maintained in a high precision relative position arrangement as would usually be necessary when a shaft and gears are used in the power leg of a conventional outdrive.

An exemplary flexible member 37 is a toothed belt sold by Gates Rubber Company under the name POLY-CHAIN. Alternatively, a belt sold under the trademark HTD (also of Gates) may be used. Virtually any belt can be used that will withstand power transmission. One exemplary belt is formed of polyurethane construction reinforced with fiberglass and/or Kevlar and possibly including Nylon facing material. The width of the belt and the strength characteristics of the belt are a function of the amount of power or torque intended to be coupled via the belt. Other types of belts, toothed or not, also may be used. The half length of the belt is approximately the distance between the relatively outer spaced-apart portions of the upper and lower sprocket assemblies 35, 36. A chain or other relatively flexible member may be used as a substitute for the belt, although the noise generated by a chain, for example, may be undesirable and/or unacceptable. Exemplary belts which might be used are disclosed in U.S. Pat. Nos. 3,964,328; 4,605,389; or 4,652,252.

Upper Sprocket Assembly 35

The upper sprocket assembly 35, which is seen in FIGS. 1, 2, 3 and 9, includes a sprocket 181 having a plurality of teeth or grooves 182 intended to cooperate with the teeth 183 (shown in FIG. 9) in the belt 37 to move the belt, such motion being referred to as rotation of the belt, as the upper sprocket assembly is turned. In this regard, the rotatable shaft 162 from the universal joint 161 is coupled to the upper sprocket assembly 35 to turn the same and, thus, the belt 37.

Preferably the upper sprocket assembly 35 is of a cartridge design in that it can be inserted as a unit into an appropriate opening and recess arrangement 184 provided therefor in the housing 12 facilitating installation, removal, and replacement, for example. The upper sprocket assembly 35 includes a sprocket 181, a pair of bearings 185, 186 mounted to permit the sprocket to rotate about the axis B as it is turned by the rotatable shaft 162, a closed-end rear cartridge housing 187 and a forward cartridge housing 188 with an opening 189 therein. The opening 189 is for passing the rotatable shaft 162 into the enclosed cartridge area 190 for mechanical connection to the sprocket 181 to turn the sprocket in the bearings 185, 186 as the universal joint 161 is turned by the drive shaft 14a. A seal 191 prevents dirt from entering the sprocket housing area 190 via the opening 189 and also retains lubricant, such as oil, grease, etc., in the area 190 to lubricate the bearing 186. Similarly, the cartridge housing portion 187 may contain in the cartridge housing area 192 a lubricant, such as grease, etc., to lubricate the bearing 185.

The various portions of the upper sprocket assembly 35 may be made of plastic material or of metal. For example, one or more of such parts may be made of various plastic materials so as to be relatively strong, relatively light in weight and not subject to corrosion. Preferably such parts can be made using relatively inexpensive methods, such as molding or extruding. The seal 191 may be of rubber, plastic or other material that provides an adequate sealing function for the described purpose.

As seen in FIG. 2, preferably the housing 12 of the outdrive 30 is formed of two halves 200, 201 that are assembled in a clam shell type of construction. The two halves may be substantially the same (e.g., respective mirror images) and may be secured together at a seam so as to facilitate placement of, support of, enclosing of, and functioning of the various parts contained therein. In FIGS. 1B and 3 the inside of the port side clam shell housing 200 is illustrated; the starboard side clam shell housing may be similarly formed and joined by adhesive material, sealant, gaskets, screws or other threaded fasteners, rivets, etc., to the port side half of the housing 12 along the various interfacing surfaces, one being designated 202, for example. In FIG. 2 the clam shell portions 200, 201 of the housing 12 are illustrated divided along the center line 203 of the outdrive 30. The seam at which the two clam shell halves are secured would be along the center line 203. However, if desired, other modified clam shell housings where parts interfit with each other also may be employed in accordance with the spirit and scope of the present invention. In the illustrated embodiment the shell is split front to back; however, it will be appreciated that the shell can be split in different ways, too, such as port to starboard, angularly, etc.

As is seen in FIGS. 1 and 3, since the upper sprocket assembly 35 is of a cartridge form, it can fit in and among a number of bosses, protrusions, etc., such as those identified at 210, 211 at which the cartridge housings 187, 188 are secured to hold the bearings 185, 186 and the sprocket 181 in position illustrated for operation. The cartridge housings may have flat wall surfaces and angled corners that cooperate with rail-like structures formed by the bosses 210, 211 to hold the cartridge in position in the housing 12. If desired, a different type of upper sprocket assembly 35 may be substituted for the one illustrated so long as the outside dimensions thereof are appropriate to fit within the areas provided by the bosses 210, 211 and/or other mounting structure provided therefor in the housing 12. For example, different respective upper sprocket assemblies 35 may be used to substitute sprockets 181 that have different respective numbers of teeth thereon and/or effective diameters thereof and/or that have other associated mechanisms, such as a cone clutch, which will be described further below with respect to FIG. 19.

In the preferred embodiment, after the power leg 180 of the outdrive 30 has been manufactured, in most instances it would not be intended to substitute and/or to repair various parts thereof in the field, although repair of various parts and/or replacement of various parts may be effected at the factory where the clam shell halves 200, 201 may be separated for access to the parts therein. It may be possible to repair the outdrive in the field; but it is preferred to effect repair at the factory. Moreover, since the power leg is relatively lightweight, removal thereof from the gimbal ring 100 can be done by one person in many instances, thus facilitating such return for servicing.

Belt Tensioning

It is desirable, and in many instances necessary, to apply tension to the belt 37. The invention employs a pretensioning mechanism and also may include a dynamic tensioning mechanism. The tension should be appropriate to assure that the belt remains securely mounted on the upper and lower sprocket assemblies 35, 36 and that it does not slip during operation of the outdrive 30 to transfer the appropriate amount of power. Also, the belt needs to be pretensioned to offset the torque developed by the engine on the power leg 180. Specifically, as torque is applied, one side of the belt would tend to become slack. The tension helps to prevent this from occurring. The appropriate amount of tension may be from several hundred to several thousand pounds of tension, depending on the torque developed by or in the outdrive 30.

The cartridge housings 187, 188 may have rectangular exterior shape to fit in and to slide in rails formed by the bosses 210, 211 across the top, bottom and especially the sides of the cartridge housings 187, 188. The cartridge housings then can slide within the rails vertically, e.g., away from the lower sprocket assembly 36 to apply the desired static tension forces.

In the embodiment illustrated in FIGS. 1 and 3, for example, a permanent type of pretension may be applied by providing chambers 220, 221 in the housing 12 facing the upper sprocket assembly 35. This pretensioning sometimes is referred to as a jack up tensioning, e.g., as in an automobile jack. Material then can be applied to such chambers. That material tends to urge the upper sprocket assembly 35 away from the lower sprocket assembly 36 to tension the belt 37. Such material supplied to the chambers 220, 221 may be, for example, a fluidic material that can be injected or pumped into the chambers after the outdrive 30 has been fully assembled with the clam shell halves 200, 201 secured to each other having the sprocket assemblies 35, 36 and belt 37 properly positioned and the rotatable shaft 162 properly installed in the manner illustrated in FIGS. 1 and 3. Such fluid material may be, for example, an epoxy material or some other material that has incompressible or controlled compression characteristics to apply the desired pressure in the chambers 220, 221 and can solidify, especially while under pressure, to maintain continuing tension on the belt. Alternative means also may be employed to apply the desired tension of the belt. As one example, rigid means may be inserted into the chambers 220, 221. Alternatively, other means may be used to apply the desired tensioning forces. In any event, it will be appreciated that by applying force or pressure within the chambers 220, 221 the upper sprocket assembly 35 is urged away from the lower sprocket assembly 36 thereby to apply tension to the belt 37.

A technique for dynamic tensioning may be employed in the invention, as is illustrated in FIGS. 10, 11, 12A and 12B. By using the dynamic tensioning mechanism 229, the belt 37 would not be tensioned or at least not tensioned tightly unless the belt is being driven by the engine. Depending on the set up, spring constants, various other dimensions, etc., the actual tension applied to the belt would be a function of the loading of the belt. As loading increases, e.g., as the belt RPM increases, so does the loading, at least over a range. Thus, at low power, idle or engine off condition, the belt is only lightly tensioned, and this eliminates strain on the belt and on the plastic housing 12.

In the dynamic tension mechanism 229 a modified upper sprocket assembly 35' is employed. The upper sprocket assembly 35' is similar to the sprocket assembly 35 described above except that a modified housing 230, 231 is provided at the respective opposite ends of the sprocket 181. Seals 232, 233 in the forward housing 231 retain lubricant and prevent dirt and/or water from entering the housing 231. The housings 230, 231 are split, each including an upper portion 230a, 231a in which the sprocket is mounted for rotation, and each including a lower portion 230b, 231b for supporting the upper housing portion. The upper and lower housing portions are coupled by a pivot pin 234, 235, and a spring 236, 237 at each housing biases the upper housing portion away from the respective lower housing portion to provide pretensioning.

As the sprocket 181 is counterclockwise relative to the illustration of FIGS. 12A and 12B, for example, the upper housing portions 230a, 231a pivot about the pivot pins 234, 235 to increase the tension on the belt. In FIG. 12A no pivoting motion has occurred, and in FIG. 12B such pivoted motion is depicted as having occurred to increase tension on at least one leg of the belt 37. The amount of tension applied to the belt is generally proportional to the torque applied to the belt by the sprocket. The total amount of tension is limited to the maximum pivoting permitted of the upper housing 230a, 231a relative to the lower housing 230b, 231b.

An important advantage inures to the dynamic tensioning mechanism 229 shown in FIGS. 10, 11 and 12. The belt 37 is not tensioned, other than a relatively small amount due to the springs 236, 237, or by other means that take up initial belt tension, e.g., a shim, a wedge, etc., which is placed at the appropriate location in or relative to the sprocket during assembly of the sprocket and/or of the belt drive system. The jack up feature described elsewhere herein also may be used for such tensioning purpose. Therefore, when the belt is not loaded or at least is not relatively heavily loaded (e.g., at idle or engine off) strain on the belt is reduced or even substantially eliminated. The fact that the belt is not tensioned all the time reduces long term housing loading and resulting creep.

It will be appreciated that the dynamic belt tensioning mechanism illustrated in FIGS. 10, 11 and 12 may be employed by itself or in combination with the above-described pretensioning mechanism.

Lower Sprocket Assembly 36

Referring to FIGS. 1 and 13, the lower sprocket assembly 36, too, preferably is generally of a cartridge design mounted in the housing 12 by pairs of horizontal and vertical bosses 240, 241 that form rails in the manner described above with respect to the upper sprocket assembly 35. The lower sprocket assembly 36 includes a sprocket 242 that has a plurality of teeth 243 which mesh with the teeth 183 of the belt. The diameter of the lower sprocket 242 is generally larger than the diameter of the upper sprocket 181 and the sprocket assemblies have a correspondingly different number of teeth. Therefore, a rotational speed reduction is effected between the rotatable shaft 162 and the propeller 15 due to the ratio of the diameters and number of teeth on the respective sprockets 181, 242. Using different ratios, different speed reduction effects can be obtained without using additional gears, transmissions, or the like. Of course, if desired, a 1:1 ratio of diameters and teeth also may be used. Further, if a non-toothed belt were used, the sprockets preferably would not have teeth.

Preferably the space between teeth on the upper and lower sprockets 181, 242 is about the same and the ratio of the number of teeth on the larger to the smaller is from about 2:1 to about 1:1; and more preferably from about 1.7:1 to about 1.5:1. In an example, the lower sprocket 242 may have on the order of 39 teeth and the upper sprocket 181 may have on the order of 22 teeth. Using the sprockets to effect a reduction in speed between the rotatable shaft 162 and the propeller 15 provides a desired speed reduction of the type accomplished in the past by conventional gears in prior art outdrives.

The sprocket 242 is supported for rotary motion by a pair of bearings 244, 245, which are secured in position in the manner illustrated by respective cartridge housing portions 246, 247 and generally in the manner described above with respect to the upper sprocket assembly 35. The lower sprocket preferably is fixed and does not move for adjustment. At the rear end of the sprocket 242 are a pair of seals 250 which circumscribe part of a stepped-down diameter output shaft portion 251 of the sprocket 242 to prevent water from reaching the bearing 244 and/or other interior portions of the sprocket assembly 36 and the belt chamber 38. The seals also help to prevent lubricant or other fluid material intended to be in the belt chamber 38 from leaking out.

The propeller 15 may be mounted directly onto the output shaft portion 251 of the sprocket 242, for example, by using a threaded fastening connection, a conventional screw fastener, or adhesive material placed at the interfacial area 253 of connection between the propeller and the shaft 251. Other means also may be employed to secure the propeller 15 onto the shaft 251.

It will be appreciated, then, that as the engine produces a rotary output, which is coupled by the drive shaft portion 14a to the universal joint 161, the upper sprocket 181 is rotated to cause the belt 37 to be rotated. As the belt 37 is rotated, belt tension is increased by preferably using the dynamic tensioning mechanism of FIGS. 10, 11, and 12 of an upper sprocket assembly 35' and the lower sprocket 242 is rotated, which then turns the propeller 15.

Variable Pitch/Reversing Pitch Propeller Actuator Embodiment

In an embodiment of the invention, the propeller 15 may be of a type that has variable pitch and/or reversing pitch blades 260. The pitch thereof may be changed by a mechanism included within the propeller 15 that is actuated by a push rod 261 located within and along the center line of the lower sprocket 242. The push rod 261 may be sealed within a cylindrical opening 262 of the lower sprocket 242 by an o-ring 263 to prevent leakage of water into the belt chamber 38 or lubricant out from the belt chamber 38. The push rod may be actuated by a conventional fluid actuator 265. Such push rod is spring loaded to the position illustrated in FIGS. 1B and 13 by a return spring 268 or may be so urged by the reaction force against the propeller, i.e., being urged to the right against a piston 266. The piston 266 is coupled to a rolling diaphragm 267 that forms a relatively low pressure hydraulic (or pneumatic) chamber 270 in a cylinder 271 that is secured to an open end of the cartridge housing 247 of the lower sprocket assembly 36. A flange portion 272 of the diaphragm 267 is trapped between a pair of flanges 273 of two generally cylindrical portions of the cylinder 271.

In response to application or removal of fluid pressure from a fluid connection 274 to the chamber 270 of the fluid actuator 265, pressure in the chamber can be altered to determine whether the piston 266 is driven to the left or not against the return spring. When the piston is driven to the left, push rod 261 would be driven to the left and, accordingly, a mechanism in or associated with the propeller 15 would respond to alter the pitch or direction of the blades 260. However, upon release of the pressure in the chamber 270, the blades 260 in response to the return spring urge the push rod 261 to the right tending to reduce the volume in the chamber 270. The fluid inlet 274 may be coupled to a source of hydraulic fluid or pneumatic fluid that is controlled by controls 21 to effect the desired operation of the blades 260, as was described.

An advantage to using a variable pitch or reversing pitch propeller, especially a propeller that is able to assume a forward pitch or a reverse pitch to drive the boat 3 in forward or reverse directions, is that there is no need for a transmission for determining forward or reverse rotation. This helps to minimize cost and also can reduce boat weight.

The various portions of the lower sprocket assembly 36 preferably also are made of plastic material or metal. The diaphragm 267 may be of rubber or similar material. Moreover, if desired, the propeller 15 itself may be made of plastic material. Use of plastic, as was described above, facilitates manufacturing, reduces the cost of manufacturing, avoids corrosion problems and minimizes weight of the various parts of the outdrive 30.

External Features

As is seen in FIGS. 1, 2 and 14–16, at the bottom of the power leg 180 is a replaceable skeg 280. Such replaceable skeg is mounted by a dovetail groove connection 281 to the clam shell halves 200, 201 where they are secured together at the bottom 282 thereof. The skeg 280 provides direction control with a rudder-type action for the outdrive 30 and boat 3. The skeg 280 also helps provide a measure of protection for the propeller 15 to prevent the blades 260 from striking the bottom of the body of water in which the outdrive is operated and also provides a measure of protection for the blades 260 from striking a solid object, such as a rock, submerged log, etc. In the event the skeg 280 becomes damaged or destroyed, it can be slid out from the groove in which it is connected to the bottom 282 of the housing 12, and an undamaged skeg then can be reinstalled by sliding the same into the dovetail groove connection 281.

The skeg may also be made in various "winged" configurations to provide a prescribed amount of lift to affect the trim of the boat. Such a winged configuration is illustrated at 280a in FIGS. 14A and 16A. Such winged skeg may help enable the boat to go up on a plane under appropriate conditions.

A plate 283 is molded as part of the housing 12. The plate 283 provides the usual function of anti-ventilation, i.e., to tend to prevent air from becoming entrained in the stream of fluid, e.g., the water, through which the propeller turns and propels the boat. Another function of plate 283 is to block spray of water upward. Since the plate 283 preferably is integrally molded and formed as part of the respective clam shell halves 200, 201, no additional work effort is required to manufacture and/or to install such plate on the outdrive 30.

As is seen in FIG. 15, the passages 150, 151 for the bifurcated portions 58a, 58b of the rod 58 extend in the upper housing portion 32. Since much of the outdrive housing 12 is likely to be submerged at least when the boat is at rest, it is likely that water will enter such passages. A drain opening 284 (FIG. 1B) in the back of the upper housing portion 32 may be provided to drain such water when that drain is above the water level.

Trim, Tilt, Kickup Mechanism 53

Referring, now, to the trim, tilt and kickup mechanism 53, which is shown in FIGS. 1, 3, 17 and 18, the actuator 54, including the piston 55, cylinder 56 and rod 58 preferably are made of plastic material to minimize cost of materials and of manufacturing, to minimize weight, and to eliminate corrosion problems. The rod 58 is generally linear, relatively long, and bifurcated, although other shape of rod may be employed, as may be desired, depending on the particular design and structure of the outdrive 30.

The cylinder 56 is formed by two housing parts 291, 292, both of which preferably are generally of hollow cylindrical configuration. The housing parts 291, 292 are coupled together at a flange connection 294 where the annular flange 295 of the rolling diaphragm 57 also is connected. The diaphragm 57 may be of rubber, reinforced rubber, or other material, which is available commerically, for example, from Bellofram Corporation. The diaphragm 57 cooperates with the housing 291 to form a variable volume fluid chamber 59 into which fluid, such as hydraulic fluid or pneumatic fluid, for example, may be delivered to increase or to decrease the pressure in the chamber and, thus, the volume thereof. The piston 55 is mounted behind the cap-like portion 296 of the rolling diaphragm 57 both to support the diaphragm and to support the rod 58 relative to the diaphragm and the balance of the actuator 54. Such fluid actuators are well known in the art.

The cylinder 56 is mounted at the flanges 294 between several bosses generally designated 297 (FIG. 1B) to secure the actuator 54 in the outdrive housing 12. As a result, as the cylinder 56 and the piston 55 undergo relative movement, relative movement must occur between the housing 12 and the gimbal ring 100 at which the rod 58 is connected. Such latter relative movement is in effect a trimming or tilting type of action. The axis of rotation of the outdrive 30 in response to such relative movement of the piston 55 and cylinder 56 is the trim axis T, as was described above.

To change the trim of the power leg 180, one may increase or decrease fluid pressure in the chamber 59. Such change may be effected by the operator of the boat adjusting the controls 21 to adjust an appropriate hydraulic control line coupled, for example, at 301 to the fluid chamber 59. Moreover, it it were desired fully to tilt the power leg a maximum degree of tilt, say, for example, 50 degrees to about 60 degrees, preferably about 52 degrees, i.e., angle A, as is illustrated in FIG. 1B, fluid pressure may be applied to the chamber 59 to move the cylinder 56 to a maximum extended position relative to the back of the boat and the piston 55. As long as fluid volume in the chamber 59 is maintained, then, the power leg would remain fully tilted, e.g., for servicing, transporting, or other reason.

The actuator 54, cylinder 56 and the piston 55 may have a relatively large cross-sectional area transverse to the direction of relative movement thereof, say on the order of about eighteen square inches. The large surface area against which fluid pressure in the chamber 59 acts, then, enables a relatively low pressure fluid to develop a relatively large force to move the cylinder 56 relative to the piston 55 to tilt the power leg 180. The relatively large cross-sectional area of the actuator 54 and the operability thereof in response to only relatively low fluid pressure enables the cylinder 56 and the piston 55 to be of molded plastic. One exemplary material is a thermoplastic polyester. The rod 58 also preferably is made of high strength plastic able to withstand the compression and tension forces applied thereto, as is described herein.

Kickup allows the power leg 180 to tilt about the axis T when the leading edge 302 of the power leg 180, the propeller 15, or some other part of the outdrive 30 strikes an object, such as a rock, log, the bottom, etc. Such tilting allows the lower portion of the outdrive to tilt out of the way of such object, preferably without damaging the outdrive 30.

The force tending to kickup the power leg 180 initially is balanced against the sum of the forces created by the weight of the power leg itself, atmospheric pressure acting against the back side of the piston 55 in the actuator 54 and the thrust of the propeller. When that kickup force is large enough to overcome that sum and the inertia of the power leg 180, a vacuum tends to be created in the chamber 59 of the actuator 54 as the power leg is kicked up to tilt about the tilt axis T. After kickup has begun, the force required to create that vacuum to continue the tilting remains substantially constant.

Hydraulic fluid in the chamber 59 ordinarily does not have to flow during kickup. After the force tending to kick up the power leg 180 terminates, atmospheric pressure acting against the surface area of the piston 55 tends to return the piston to the original position in the chamber 59 and the power leg 180 back to the original pre-kickup orientation. The weight of the power leg 180 and the propeller thrust responding to gravity force also helps return the power leg 180 back to the pre-kickup orientation.

Summarizing, then, when the leading edge 302 of the power leg 180 strikes an object and the force of that strike is adequate to overcome the atmospheric pressure times the area at the back of the piston 55 plus the weight of the power leg 180, then the power leg 180 will tilt about the axis T. The piston 55 actually remains in position relative to the gimbal ring 56, as the cylinder 56, which is fixedly mounted in or to the housing 12, is moved to pull a vacuum in the cylinder chamber 59. The kickup force remains constant because the force needed to be overcome is atmospheric pressure times the area of the back side of the piston 55. Since the kickup force, then, is so limited, the possibility of damage to the outdrive is minimized. Moreover, since the kickup force is uniform, the entire power leg kicks up in a substantially continuous action, and it is less likely to deform or to distort as it achieves a higher tilt, e.g., as a log pushes past. If the kickup force were variable and/or in particular, if the force exceeded a certain relatively high level, e.g., as a function of tilt, then such a high force could distort and/or damage the plastic housing 12.

After the kickup force has been eliminated, the power leg 180 will return to the original position it had assumed prior to having been kicked up.

Back Benders 42, 43

It is desirable that an outdrive have a relatively small cross-sectional area transverse to the direction of travel through the water. See FIGS. 2, 15 and 16. A potential disadvantage in using a belt 37 or other flexible member which has two legs 40, 41 is that space is required to house each of the belt legs. In the past such space requirement would have required a relatively broad cross-section or two down legs as in the above Dunlap patent.

However, it has been discovered in accordance with the present invention that the belt 37 can be bent backwards to compress the legs 40, 41 thereof toward each other in a way that tends to minimize the cross-sectional area profile of the outdrive transversely to the direction of travel through the water.

Turning to FIG. 2, a front elevation view, partly in section, of the belt drive assembly 31 forming part of the power leg 180 is illustrated in detail. The respective clam shell housings 200, 201 near the bottom of the outdrive define a bulbous shape, often referred to as the torpedo 34 of the outdrive 30 behind which the propeller 15 (not shown) would be mounted. The torpedo 34 houses the lower sprocket assembly 36.

The back bending function is accomplished by a pair of relatively strong curved plates 42, 43, sometimes referred to as skid plates or back benders. Such plates 42, 43 are of relatively strong material able to urge the legs 40, 41 of the belt 37 toward each other with adequate force without damaging the clam shell housing parts 200, 201 on which the plates 42, 43 may actually be mounted. The plates 42, 43 preferably are formed of stainless steel material or aluminum. Alternatively, they may be formed of some other metal material. The plates 42, 43 may be precoated with a low friction material, such as that sold under the trademark Teflon, to facilitate sliding of the belt 37 over the surfaces of the plates. For example, the plates may be coated with a Teflon impregnated anodizing material.

The plates 42, 43 preferably are bent or curved in the manner illustrated so as to form a segment of an arc of a circle. Such circle preferably if extended would be tangent or approximately tangent with the travel direction of the belt about the lower sprocket 242.

A lubricating medium 319, such as oil, transmission fluid, gear oil, or the like, is in the belt chamber 38. The belt chamber 38 is coupled to a sump 320, which extends from the bottom of the lower sprocket 242 part way up along the sides thereof, between the belt 37 and the housing 12, as is illustrated in FIG. 2. It has been found that an adequate amount of lubricant is available when the sump 320 is filled to a level that is less than about one-half the diameter of the lower sprocket 242.

Such lubricant fluid 319 preferably is splashed by the rotating sprocket 242 and by the belt 37 at both surfaces thereof and particularly at the surface that faces the respective plates 42, 43 to provide a thin sliding surface interface between the belt legs 40, 41 and the plates 42, 43. The fluid 319 also provides a cooling or heat transfer function to remove heat from the outdrive 30. It has been found that a relatively small amount of lubricant 319 will enable the belt 37 to slide smoothly and with minimal friction over the surfaces of the plates 42, 43 without encountering unusual belt wear. Belt wear is therefore, preferably kept to a minimum.

In fact a layer of lubricant 319 that is on the order of from one to several molecules thick has been found especially desirable between the belt legs 40, 41 and the smooth surfaces 44, 45 of the plates 42, 43. Preferably such surfaces are smooth and polished further to minimize friction and belt wear. Also, preferably the back surface of the belt 37 facing the back bender surfaces 44, 45 may have grooves that extend in the width direction or dimension of the belt 37. Such grooves appear to enhance the thermal energy transfer between the belt and the surfaces 44, 45. It appears that such grooves carry fluid 319 to the surfaces 44, 45 from the sump 320, contribute to splashing of such fluid elsewhere in the belt chamber-38, and/or cause turbulence in the carried fluid 319, all of which appear to cooperate to improve efficiency of heat transfer between the fluid 319 and the plates 42, 43. The fluid reduces the amount of friction and, therefore, the amount of heat generated; and the amount of heat dissipation is reduced significantly.

According to the invention, the belt 37 is pinched together near the bottom by passive structural means, namely, the plates 42, 43 and/or the housing 12 itself. According to the preferred embodiment, there is no need for any rotating elements, such as idler wheels, to pinch the belt. The belt is dragged across the plates 42, 43. The belt tends to float on the lubricant fluid hydrodynamically slightly away from the surfaces of the plates 42, 43, thus minimizing wear of the belt.

The radius of the back bend desirable is circular and is not so severe as to cause undue wear of the belt. In the preferred embodiment, the radius of curvature may be, for example, on the order of 24 inches. The actual radius of curvature of the back bend tends to determine the size of the cross-sectional area of the submerged portion of the power leg; while it is desirable to maximize the radius of curvature of the plates 42, 43 to minimize wear of the belt 37, it also is desirable to minimize that radius of curvature to minimize the mentioned cross-sectional area.

The use of back bending of the belt tends to improve the overall hydrodynamics of the submerged portion of the outdrive, and, as a result, drag through the water is reduced. If desired, other means may be used to back bend the belt.

If desired, lubricant from the sump 320 may be specially sprayed at particular locations in the area of the torpedo 34 and/or plates 42, 43, or on the belt 37 itself to achieve a desired lubricating function vis-a-vis the belt and the plates. However, it has been found that normal splashing without specific directing of jets of lubricant toward strategic spots adequately achieves the desired lubricating function.

If desired, the lubricant 319 may be directed through a heat exchanger to cool the fluid to reduce belt wear due to heat. More preferably, though, a cooling water flow 48 is provided in chamber areas 49, 50 behind the back benders 42, 43. Seals 332, 333 prevent leakage between the water chambers 49, 50 and the belt chamber 38. An inlet 334 for receiving cooling water flow is provided at or approximate the torpedo 34. Ordinarily such inlet preferably is under water. Conventional means may be used otherwise to seal the chambers 49, 50 to prevent leakage, and flow lines may be provided otherwise to conduct cooling water flow 48, as may be desired.

According to an exemplary embodiment of the invention, the belt 37 is one sold under the trademark POLY-CHAIN having an 8 millimeter pitch. Coarser and finer pitches also are available and may be employed. However, coarser pitches tend not to be as pliable for bending around short radii, such as those employed using the upper and lower sprockets of the present invention. Pitch is the distance between teeth when the belt is laid out flat. Preferably the present invention uses a relatively small pitch series belt to enable bending around relatively short radii of the sprockets.

An advantage to the use of the back bent belt in addition to the low cross-sectional area provided is the increase in the number of belt teeth and sprocket teeth that are engaged as the belt goes around the respective sprockets, as compared to the number of interengaged teeth when the belt legs run "straight" between sprockets. The increased number of interengaged teeth enhances the power coupling efficiency and effectiveness between the belt and the sprockets.

Cone Clutch Upper Sprocket Assembly

Figure 19:
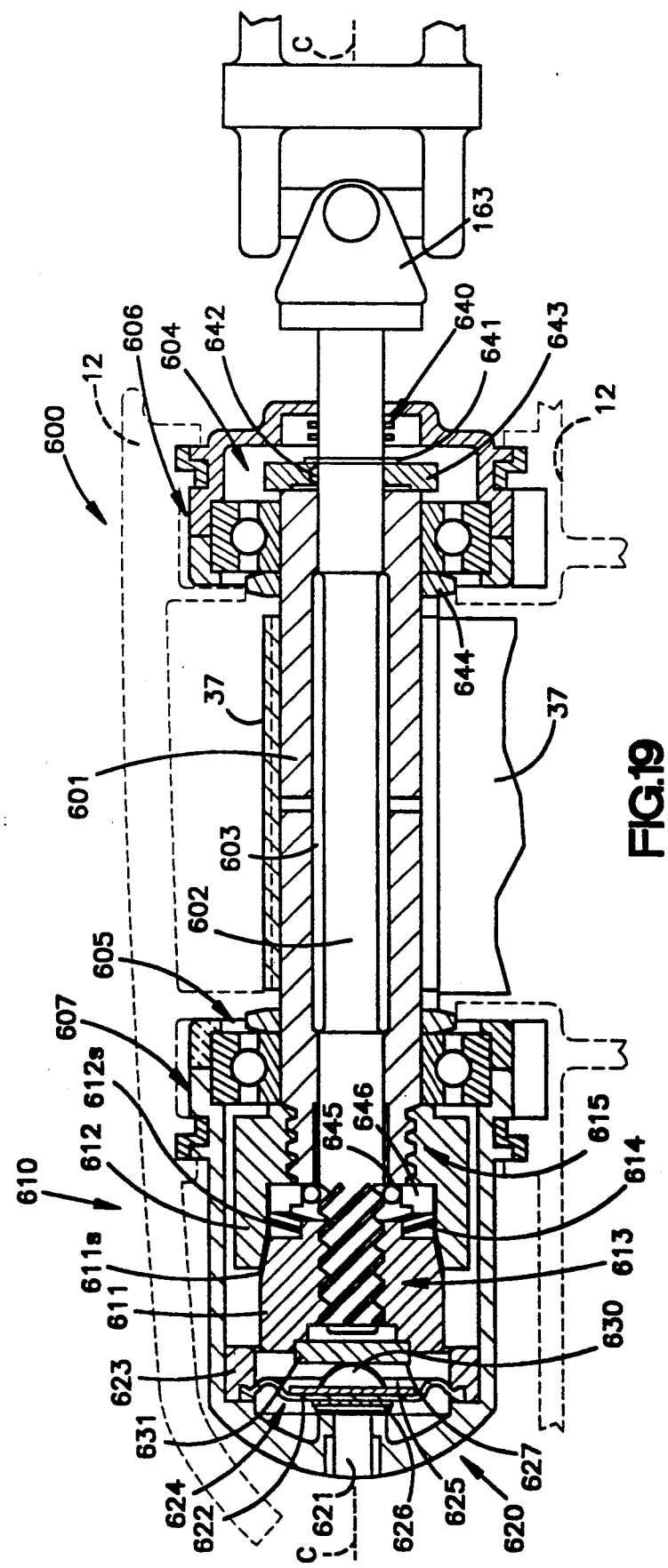
FIG. 19 is a side elevation view, partly in section, of a cone clutch assembly used with the upper sprocket assembly.

Turning to FIG. 19, a cone clutch assembly 600 is shown. The cone clutch assembly 600 may be substituted for the upper sprocket assembly 35 in the outdrive 30 of the present invention. The cone clutch assembly 600 is selectively operable to couple rotary motion from the universal joint to the belt 37 via a sprocket 601 that is able to be rotated. Actuation of the cone clutch assembly 600 may be carried out by a connection to and operation of the controls 21.

A rotatable shaft 602 of the cone clutch 600 assembly is mounted in a hollow opening 603 of the sprocket 601 for rotation independently or coextensively therewith as a function of whether or not the cone clutch is actuated. Accordingly, the sprocket 601 and the shaft 602 are concentric; and although they are in relatively close fit relation, they are able to rotate relative to each other when the cone clutch is not actuated. The shaft 602 is connected to the connector 163 of the universal joint for rotation thereby. The sprocket 601 is mounted in bearings 604, 605 which in turn are mounted in housings 606, 607 that can be mounted in the housing 12 of the outdrive 30, e.g., as the upper sprocket assembly 35 described above is mounted. If desired, pre-tensioning means and/or dynamic tensioning means, as were described above relative to the upper sprocket assembly 35, may be employed with the cone clutch assembly 600 and the mounting thereof if the housing 12.

A cone clutch mechanism 610 of the cone clutch assembly 600 particularly includes a cone 611 and a cup 612. The cone and cup are positioned for relative axial movement along the axis C about which the sprocket 601 and the shaft 602 are concentrically arranged. When the cone 611 and cup 612 are relatively separated along the axis C, no motion is coupled from one to the other, and one can rotate relative to the other. However, when the cone 611 and cup 612 are engaged with each other at confronting surfaces 611s, 612s, rotational effort from one causes the other to rotate therewith.

In the illustrated embodiment the cone 611 is mounted at an end of the shaft 602 at a threaded connection 613. The thread preferably is a spiral thread, the male being on the shaft and the female being interiorly of the cone. Preferably the cone 611 can be rotated on the male thread to move the cone along the axis C toward or away from the cup 612. A resilient member 614, such as a belleville spring or washer, normally urges the cone to the left relative to the illustration of FIG. 19, away from engagement with the cup 612. Other types of resilient members alternatively may be used for such purpose.

The cup 612 is mounted on the sprocket 601, for example by a secure threaded connection 615. The cup rotates with the sprocket 601. In particular, when the cone 611 engages the cup 612, rotary motion of the shaft 602 is coupled to the sprocket 601 to rotate the sprocket and, thus, to drive the belt.

A fluid actuator mechanism 620 is used to actuate the cone clutch assembly 600 to couple rotary motion from the power supply and universal joint to the sprocket 601. (Other types of actuators, such as mechanical or electrical type, may equivalently be used.) A fluid connection 621 couples the fluid actuator to the controls 21 to receive fluid pressure, volume or other fluid input to actuate the cone clutch mechanism 600; and may relieve such fluid pressure, drain fluid volume, etc., to deactuate the cone clutch mechanism.

A diaphragm 622 is secured in the housing 607 by a retaining ring 623 in conventional fashion to define a fluid chamber 624. The diaphragm 622 is reinforced by a retainer plate 625 and a washer 626, which are secured to each other by a rivet 630. The fluid connection 621 is coupled to the fluid chamber 624 to supply or to drain fluid with respect thereto. The head of the rivet 630 is positioned to be in and/or to move into engagement with a wear plate 631 that is attached to the cone 611.

When the cone clutch mechanism is not actuated, ordinarily the quantity and/or pressure of fluid in a chamber 624 is minimal, and the spring 614 urges the cone 611 along the spiral thread 613 away from the cup 612. In response to application of fluid and/or fluid pressure via the fluid connection 621 to the fluid chamber 624, the rivet head 630 working against the wear plate 631 urges the cone 611 against the spring 614 and to the right along as the cone rotate along the thread 613. The angle on the thread is selected such that it is not self-locking; yet it is adequate to provide the required amount of axial motion along the axis C by the cone 611. As the surfaces 611s and 612s engage, the forces and/or resistances developed are such that the cup is tightened along the thread and is further secured into engagement with the cone. For example, the cup tends to resist rotating due to its inertia and that of the belt, etc., thus causing it to try to slow down the rotating cone, which, therefore, tends to undergo relative rotation to the shaft 602; as a result, the thread pulls the cone tightly against the cup. A secure connection between the cone and cup thus being made, the rotary motion of the shaft 602 turns the sprocket 601 and drives the belt 37. When fluid pressure in the fluid chamber 624 subsequently is relieved, the spring 614 urges the cone to the left relative to the illustration to disengage from the cup.

It will be appreciated, then, that the cone clutch mechanism 600 may be operated by the controls 21 or by some other means to engage and to disengage the belt 37 and, thus, the propeller of the boat, for example.

Additional details of the cone clutch assembly 600 include a rotatable shaft seal 640 which prevents water from entering the housing 606, for example, and retains lubricant in the housing. A retaining ring 641, ball key 642, and thrust washer 643 prevent the shaft 602 from moving along the axis C, and the key causes the thrust washer to turn with the shaft. A flange 644 helps hold the bearing 604 in place and prevents the belt 37 from moving off the sprocket 601. A retaining ring 645 retains a thrust washer 646 in place on the shaft 602; and the spring 614 bears against such thrust washer.

It is noted that the cone clutch assembly 600 is a single acting cone clutch. This is as compared to a dual acting cone clutch in which one actuator mechanism is required for forward and the for reverse movement. In the present invention, though, actuation is via fluid; and return or deactuation is by the force of the spring 614.

The following summarizes a number (although not all) of features of the invention:

As to the plastic housing, preferably it is formed of plastic structural members, either of the thermoset or thermoplastic type. The housing is of clam shell construction, which provides strength, convenience of assembly, convenience of manufacturing, and minimum expense. For example, both halves of the clam shell may be mirror images of each other, thus facilitating engineering and designing, as well as making of a mold to mold the same. The clam shell halves may be secured together by rivets, screws, or even may be glued. The skeg at the bottom is replaceable by sliding out from the dovetail connection thereof to the housing 12. Metal skegs tend to become damaged, but typically cannot easily be replaced, whereas the instant plastic one can easily be replaced.

A plastic housing does not have to be painted because the color may be an integral part of the plastic material of which the housing is molded. Although some antifouling paints cannot be applied to aluminum casting outdrives due to galvanic action of the paint with the aluminum material of the outdrive, virtually any paint can be applied to a plastic material. A plastic outdrive will not corrode, is cost effective, and is relatively lightweight.

Due to the lightweight of the plastic outdrive of the invention, the power leg of the outdrive can be easily disassembled from the gimbal ring 100 by a single individual without having to enter the boat. Moreover, the gimbal ring structure itself may be removed from the outer transom housing by disconnecting the upper and lower rudder pins from the mounting structure thereof, also preferably without having to enter the boat.

Various component parts of the outdrive 30 may be of plastic material, as is described in further detail above. Examples include the bearing housings, tilt cylinder structure, transom housing, actuator shafts, and so on. The various fittings to which hydraulic and/or pneumatic lines are connected and the lines themselves can be plastic since relatively low pressures are used in the invention. Such parts can be assembled by gluing together. Such plastic parts are cost effective, will not corrode, are lightweight and can be manufactured and/or replaced easily. Because of heat, it is desirable to use metal, e.g., aluminum, for the sprockets to displace heat from the belt. It is desirable to use thermally conductive sprockets to dissipate heat from the belt. Moreover, to extend the belt life under severe load it is desirable to provide a very smooth finish on the surface of the sprockets where they engage the belt 37. For example, such surface can be polished and coated with anodizing or nickel for smoothness.

The way the belt 37 is mounted permits the use of the internal trim, tilt and kickup mechanism 53 compared to the external trim/tilt cylinders of prior art devices, which encounter snagging and spray problems and are somewhat unsightly. Specifically, in the present invention the actuator rod of the trim/tilt assembly may pass outside the two legs 40, 41 of the belt 37, but still within the housing 12 so that the cylinder 56 can be located in line therewith and not outboard the major front/rear axis of the boat.

The toothed belt drive is oil lubricated and will be oil cooled. Back bending of the belt permits reduced hydrodynamic drag on the portion of the outdrive which is located in the water.

A rolling diaphragm cylinder is used in the trim/tilt structure 45, and the cylinder thereof utilizes atmospheric pressure in conjunction with the kickup and return features of the outdrive.

Since the trim/tilt cylinder and the actuator on the lower sprocket for changing or reversing the pitch of the propeller are low pressure actuators, they can be made of plastic, which is relatively inexpensive. Since those actuators operate at relatively low pressure, the various hydraulic lines and/or fittings associated therewith can be of plastic and relatively inexpensive rubber material, respectively; and the hydraulic lines and fittings can be glued together.

As was mentioned earlier, the outdrive can be easily removed from the boat and sent back to the factory for servicing or replacement. To remove the power leg 180, for example, the trim bolts or shoulder screws 142, 143 can be removed; the bellows or boot 93 can be disconnected; the hydraulic lines can be disconnected; the pin 158 is removed; and then the power leg 180 can be easily removed from the gimbal ring 100.

To remove the gimbal ring 100, which is attached to the outer transom housing 84, the stop nut 116 is removed. A washer and screw may be installed in the bottom of the upper rudder pin 110 and using a bearing puller type device, the upper rudder pin can be pulled out toward the bottom. The lower rudder pin 132 can be removed by unscrewing it. The gimbal ring 100 then can be removed.

It is noted here that the invention has been described with respect to an outdrive 30; but it will be appreciated that the features of the invention may be used with other drives, such as outboards, inboards, and various hybrid drives, especially for watercraft, and also for other vehicles.

We claim:

1. An outdrive for a boat, comprising
   a power input shaft,
   a power output shaft,
   a first sprocket coaxially attached to said power input shaft,
   a second sprocket coaxially attached to said power output shaft,
   an endless loop engaged about said first and second sprockets such that rotational input power from said power input shaft is coupled to said power output shaft as rotational output power, said endless loop comprising plural legs extending between said sprockets,
   a back bender having a generally smooth surface for bending the path of at least one of said legs toward another of said legs, wherein said at least one leg slides across said smooth surface, and
   a single chamber housing said endless loop during travel between said shafts.

2. The outdrive of claim 1, wherein said back bender is made of metal.

3. The outdrive of claim 1, wherein said smooth surface comprises a low-friction material.

4. The outdrive of claim 3, wherein said low-friction material comprises Teflon.

5. The outdrive of claim 1, further comprising lubricating means for reducing friction at an interface between said at least one leg and said smooth surface.

6. The outdrive of claim 5, wherein said lubricating means comprises a lubricant which is distributed from a sump within said housing.

7. The outdrive of claim 6, wherein said at least one leg comprises a plurality of grooves which carry lubricant from said sump to said interface.

8. The outdrive of claim 1, wherein said smooth surface is curved, causing said at least one leg to bend along a curved path.

9. The outdrive of claim 8, wherein said at least one leg exits said smooth surface in a direction which is approximately tangent to the travel direction of said at least one leg as it engages said second sprocket.

10. The outdrive of claim 1, further comprising cooling means for conducting heat away from said back bender.

11. The outdrive of claim 10, wherein said cooling means comprises means for causing water to flow against an outside surface of said back bender.

12. The outdrive of claim 1, further comprising another back bender for bending the path of a second leg towards another of said plurality of legs.

13. The outdrive of claim 1, wherein said first and second sprockets are of different diameters.

14. An boat drive system, for propelling a boat through water comprising
   a power input shaft,
   a power output shaft,
   endless loop flexible coupling means for coupling between said shafts, said flexible means having plural legs extending between said shafts, and
   a back bender having a generally smooth surface for bending the path of at least one of said legs toward another of said legs, wherein said at least one leg slides across said smooth surface and said back bender tends to reduce the cross-sectional area profile of the drive system transversely to the direction of travel through the water.

15. The drive system of claim 14, wherein said back bender is made of metal.

16. The drive system of claim 14, wherein said smooth surface comprises a low-friction material.

17. The drive system of claim 16, wherein said low-friction material comprises Teflon.

18. The drive system of claim 14, further comprising lubricating means for reducing friction at an interface between said at least one leg and said smooth surface.

19. The drive system of claim 18, further comprising a housing surrounding said endless loop flexible coupling means and wherein said lubricating means comprises a lubricant which is distributed from a sump within said housing.

20. The drive system of claim 19, wherein said at least one leg comprises a plurality of grooves which carry lubricant from said sump to said interface.

21. The drive system of claim 14, wherein said smooth surface is curved, causing said at least one leg to bend along a curved path.

22. The drive system of claim 21, wherein said at least one leg exits said smooth surface in a direction which is approximately tangent to the travel direction of said at least one leg as it engages said second sprocket.

23. The drive system of claim 14, further comprising cooling means for conducting heat away from said back bender.

24. The drive system of claim 23, wherein said cooling means comprises means for causing water to flow against an outside surface of said back bender.

25. An outdrive for a boat comprising:
   a power input member;
   a power output member which is below the water line when said outdrive is operated;
   an endless loop flexible drive coupling operatively connecting said power input member to said power output member, said drive coupling having legs extending between said members;
   a housing around said legs; and
   structure pinching said legs together in said housing adjacent said power output member so as to narrow the cross-sectional profile of said housing below the water line and thereby reduce drag;
   said structure including at least one curved stationary surface that bends the path of travel of one of said legs toward another leg.

26. The outdrive as claimed in claim 25 wherein said surface has a constant radius of curvature.

27. The outdrive as claimed in claim 25 or claim 26 wherein said structure includes a second curved surface that is complementary to said one surface and serves to bend the path of travel of said another leg toward said one leg.

28. The outdrive as claimed in claim 25 wherein said structure is metal and is cooled by water.

29. An outdrive as claimed in claim 25 wherein said housing includes a lubricant surrounding part of said drive coupling to provide a layer of lubricant at the interface of said surface and said one leg and to facilitate heat transfer from said interface.

30. The outdrive as claimed in claim 29 wherein said drive coupling is a belt having spaced grooves facing said surface, said grooves extending from one side edge of said belt to the other edge.

* * * * *